United States Patent
Tabata et al.

(10) Patent No.: US 10,982,613 B2
(45) Date of Patent: Apr. 20, 2021

(54) CONTROLLER AND CONTROL METHOD FOR VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Hiromasa Tatsushiro, Toyota (JP); Kenta Kumazaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/934,073

(22) Filed: Jul. 21, 2020

(65) Prior Publication Data
US 2021/0025346 A1 Jan. 28, 2021

(30) Foreign Application Priority Data

Jul. 25, 2019 (JP) .............................. JP2019-137323

(51) Int. Cl.
*F02D 41/24* (2006.01)
*F02B 37/16* (2006.01)
*F02D 41/02* (2006.01)

(52) U.S. Cl.
CPC ....... *F02D 41/2441* (2013.01); *F02D 41/023* (2013.01); *F02B 37/162* (2019.05)

(58) Field of Classification Search
CPC ... F02D 41/2441; F02D 41/023; F02B 37/162
See application file for complete search history.

(56) References Cited

U.S. PATENT DOCUMENTS

| | | | | |
|---|---|---|---|---|
| 2013/0292223 | A1* | 11/2013 | Nedorezov | ..... B60W 30/18127 192/220 |
| 2016/0061317 | A1* | 3/2016 | Nagai | ..................... F02D 29/02 477/115 |
| 2016/0252180 | A1* | 9/2016 | Sato | .................. F16H 61/66259 701/51 |
| 2018/0149101 | A1* | 5/2018 | Watanabe | ............. B60W 10/02 |
| 2018/0297600 | A1* | 10/2018 | Kitagawa | ................ F02D 41/10 |
| 2018/0298833 | A1* | 10/2018 | Brischetto | ............. B60W 10/11 |

FOREIGN PATENT DOCUMENTS

JP 9-144866 A 6/1997

* cited by examiner

*Primary Examiner* — George C Jin
(74) *Attorney, Agent, or Firm* — Oblon, McClelland, Maier & Neustadt, L.L.P.

(57) ABSTRACT

A controller and a control method for a vehicle including an engine with a supercharger and an automatic transmission provided in a power transmission path between the engine and driving wheels are provided. The controller is configured to perform learning control of learning a command value associated with gear shifting of the automatic transmission. The controller is configured to limit a supercharging pressure of the supercharger when the automatic transmission is performing gear shifting to be equal to or less than a predetermined pressure until initial learning which is performed by the learning control unit in a predetermined period after the vehicle has been manufactured is completed.

8 Claims, 11 Drawing Sheets

| AT GEAR STAGE | C1 | C2 | B1 | B2 | F1 |
|---|---|---|---|---|---|
| 1st | O | | | △ | O |
| 2nd | O | | O | | |
| 3rd | O | O | | | |
| 4th | | O | O | | |
| Rev | O | | | O | |

| MOCK GEAR STAGE | | 1 | 2 | 3 | 4 | 5 | 6 | 7 | 8 | 9 | 10 |
|---|---|---|---|---|---|---|---|---|---|---|---|
| AT GEAR STAGE | UP SHIFT | 1 | 1 | 1 | 2 | 2 | 2 | 3 | 3 | 3 | 4 |
| | DOWN SHIFT | 1 | 1 | 2 | 2 | 2 | 3 | 3 | 3 | 4 | 4 |

CONTROLLER AND CONTROL METHOD FOR VEHICLE

CROSS-REFERENCE TO RELATED APPLICATION

This application claims priority to Japanese Patent Application No. 2019-137323 filed on Jul. 25, 2019, incorporated herein by reference in its entirety.

BACKGROUND

1. Technical Field

The disclosure relates to a technique of decreasing a time which is required until initial learning of learning a command value to decrease unevenness in a gear shifting characteristic of an automatic transmission after a vehicle including an engine with a supercharger and an automatic transmission has been manufactured is completed.

2. Description of Related Art

A controller for a vehicle including an engine with a supercharger and an automatic transmission which is provided in a power transmission path between the engine and driving wheels is known. An example of such a controller for a vehicle is disclosed in Japanese Patent Application Publication No. 09-144866 (JP 09-144866 A). In the controller for a vehicle described in JP 09-144866 A, learning control for learning a command value associated with gear shifting of the automatic transmission is performed to improve a gear shifting characteristic of the automatic transmission, but when a supercharging pressure of the supercharger is high, an engine torque is likely to change and the engine torque which is output from the engine varies, whereby an input torque which is input to the automatic transmission also varies. Accordingly, when the learning control is performed when the supercharging pressure is high, erroneous learning of the command value is a concern. On the other hand, JP 09-144866 A proposes stopping the learning control when the supercharging pressure is higher than a predetermined pressure which is set in advance. According to this proposal, it is possible to prevent erroneous learning of the command value when the supercharging pressure is high.

SUMMARY

However, in the controller for a vehicle described in JP 09-144866 A, there is a problem in that progress of the learning is delayed by stopping the learning control. That is, immediately after the vehicle has been manufactured, the gear shifting characteristic of the automatic transmission of each vehicle becomes uneven due to production unevenness from manufacture of the vehicle and initial learning of the command value is required for decreasing unevenness of the gear shifting characteristic of the automatic transmission, but when progress of the initial learning is delayed, there is a problem in that it takes time to decrease the unevenness of the gear shifting characteristic of the automatic transmission, that is, there is a problem in that time is required until the initial learning is completed.

The disclosure provides a controller and a control method for a vehicle that can decrease a time required until unevenness in a gear shifting characteristic of an automatic transmission due to production unevenness from manufacture of the vehicle is decreased in comparison with the related art.

A first aspect of the disclosure provides a controller for a vehicle including an engine with a supercharger and an automatic transmission provided in a power transmission path between the engine and driving wheels. The controller includes a learning control unit and a supercharging pressure limiting unit. The learning control unit is configured to perform learning control of learning a command value associated with gear shifting of the automatic transmission. The supercharging pressure limiting unit is configured to limit a supercharging pressure of the supercharger when the automatic transmission is performing gear shifting to be equal to or less than a predetermined pressure until initial learning which is performed by the learning control unit in a predetermined period after the vehicle has been manufactured is completed.

According to the first aspect of the disclosure, the controller includes the learning control unit that performs learning control of learning a command value associated with gear shifting of the automatic transmission and the supercharging pressure limiting unit that limits a supercharging pressure of the supercharger when the automatic transmission is performing gear shifting to be equal to or less than a predetermined pressure until initial learning which is performed by the learning control unit in a predetermined period after the vehicle has been manufactured is completed. Accordingly, since the supercharging pressure when the automatic transmission is performing gear shifting is limited to be equal to or less than the predetermined pressure by the supercharging pressure limiting unit until the initial learning which is performed by the learning control unit in the predetermined period after the vehicle has been manufactured is completed, that is, until unevenness in a gear shifting characteristic of the automatic transmission due to production unevenness from manufacture of the vehicle is decreased, it is possible to decrease a time required until the unevenness in the gear shifting characteristic of the automatic transmission due to production unevenness from manufacture of the vehicle is decreased in comparison with a case in which the learning control is stopped when the supercharging pressure is not limited to be equal to or less than the predetermined pressure and the supercharging pressure is high.

In the controller for a vehicle according to the first aspect, the supercharging pressure limiting unit may be configured to limit the supercharging pressure of the supercharger to be equal to or less than the predetermined pressure when the automatic transmission is not performing gear shifting.

According to this configuration, the supercharging pressure limiting unit limits the supercharging pressure of the supercharger to be equal to or less than the predetermined pressure even when the automatic transmission is not performing gear shifting. Accordingly, since the supercharging pressure is limited to be equal to or less than the predetermined pressure by the supercharging pressure control unit when the automatic transmission is performing gear shifting and is not performing gear shifting, it is possible to prevent a step difference from being caused in the magnitude of the engine torque which is output from the engine before and after the automatic transmission performs gear shifting.

In the controller having the above-mentioned configuration, the supercharging pressure limiting unit may be configured to prohibit supercharging by the supercharger when the initial learning is not completed and a total travel distance of the vehicle is less than a predetermined distance. The supercharging pressure limiting unit may be configured to permit supercharging by the supercharger when the initial learning is not completed and the total travel distance is equal to or greater than the predetermined distance.

According to this configuration, when the initial learning is not completed, the supercharging pressure limiting unit prohibits supercharging by the supercharger when the total travel distance of the vehicle is less than the predetermined distance and permits supercharging by the supercharger when the total travel distance is equal to or greater than the predetermined distance. Accordingly, when the total travel distance is less than the predetermined distance and it is estimated that the initial learning does not progress, supercharging by the supercharger is prohibited to advance progress of the initial learning. When the total travel distance is equal to or greater than the predetermined distance and it is estimated that the initial learning progresses, supercharging by the supercharger can be permitted to perform progress of the initial learning and supercharging by the supercharger together.

In the controller having the above-mentioned configuration, the supercharging pressure limiting unit may be configured to prohibit supercharging by the supercharger when the initial learning is not completed and a total travel time of the vehicle is less than a predetermined time. The supercharging pressure limiting unit may be configured to permit supercharging by the supercharger when the initial learning is not completed and the total travel time is equal to or greater than the predetermined time.

According to this configuration, when the initial learning is not completed, the supercharging pressure limiting unit prohibits supercharging by the supercharger when the total travel time of the vehicle is less than the predetermined time, and permits supercharging by the supercharger when the total travel time is equal to or greater than the predetermined time. Accordingly, when the total travel time is less than the predetermined time and it is estimated that the initial learning does not progress, supercharging by the supercharger is prohibited to advance progress of the initial learning. When the total travel time is equal to or greater than the predetermined time and it is estimated that the initial learning progresses, supercharging by the supercharger is permitted to perform progress of the initial learning and supercharging by the supercharger together.

In the controller having the above-mentioned configuration, the supercharging pressure limiting unit may be configured to keep the supercharging pressure of the supercharger constant when the initial learning is not completed and the automatic transmission is performing gear shifting.

According to this configuration, since the supercharging pressure limiting unit keeps the supercharging pressure of the supercharger constant when the initial learning is not completed and the automatic transmission is performing gear shifting, it is possible to advance progress of the initial learning.

In the controller having the above-mentioned configuration, the supercharging pressure limiting unit may be configured to limit the supercharging pressure to be equal to or less than the predetermined pressure only when the initial learning is not completed and a required load required for the engine is less than a predetermined load.

According to this configuration, when the initial learning is not completed, the supercharging pressure limiting unit limits the supercharging pressure to be equal to or less than the predetermined pressure only when the required load required for the engine is less than the predetermined load. Accordingly, since the supercharging pressure is not limited to be equal to or less than the predetermined pressure when the required load required for the engine is equal to or greater than the predetermined load, it is possible to curb a shortage of the engine torque when the required load for the engine is a high load.

In the controller for a vehicle according to the first aspect of the disclosure, the vehicle may further include a rotary machine connected to the power transmission path. The controller may further include a rotary machine torque control unit configured to control a torque of the rotary machine such that a decrease of an engine torque due to limiting of the supercharging pressure to be equal to or less than the predetermined pressure by the supercharging pressure limiting unit is compensated for.

According to this configuration, the vehicle further includes the rotary machine connected to the power transmission path and the controller further includes the rotary machine torque control unit that controls the torque of the rotary machine such that a decrease of an engine torque due to limiting of the supercharging pressure to be equal to or less than the predetermined pressure by the supercharging pressure limiting unit is compensated for. Accordingly, it is possible to compensate for the decrease of the engine torque due to limiting of the supercharging pressure to be equal to or less than the predetermined pressure by the supercharging pressure limiting unit using the torque which is output from the rotary machine.

A second aspect of the disclosure provides a control method for a vehicle including an engine with a supercharger and an automatic transmission that is provided in a power transmission path between the engine and driving wheels. The control method includes: performing learning control of learning a command value associated with gear shifting of the automatic transmission; and limiting a supercharging pressure of the supercharger when the automatic transmission is performing gear shifting to be equal to or less than a predetermined pressure until initial learning which is performed by the learning control in a predetermined period after the vehicle has been manufactured is completed.

According to the second aspect of the disclosure, learning control of learning a command value associated with gear shifting of the automatic transmission is performed, the learning control is performed in a predetermined period after the vehicle has been manufactured, and the supercharging pressure of the supercharger when the automatic transmission is performing gear shifting is limited to be equal to or less than a predetermined pressure until initial learning is completed. Accordingly, for example, in comparison with a case in which the learning control is stopped when the supercharging pressure is not limited to be equal to or less than the predetermined pressure and the supercharging pressure is high, it is possible to decrease a time required until the unevenness in a gear shifting characteristic of the automatic transmission due to production unevenness from manufacture of the vehicle is decreased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the accompanying drawings.

Figure 1:
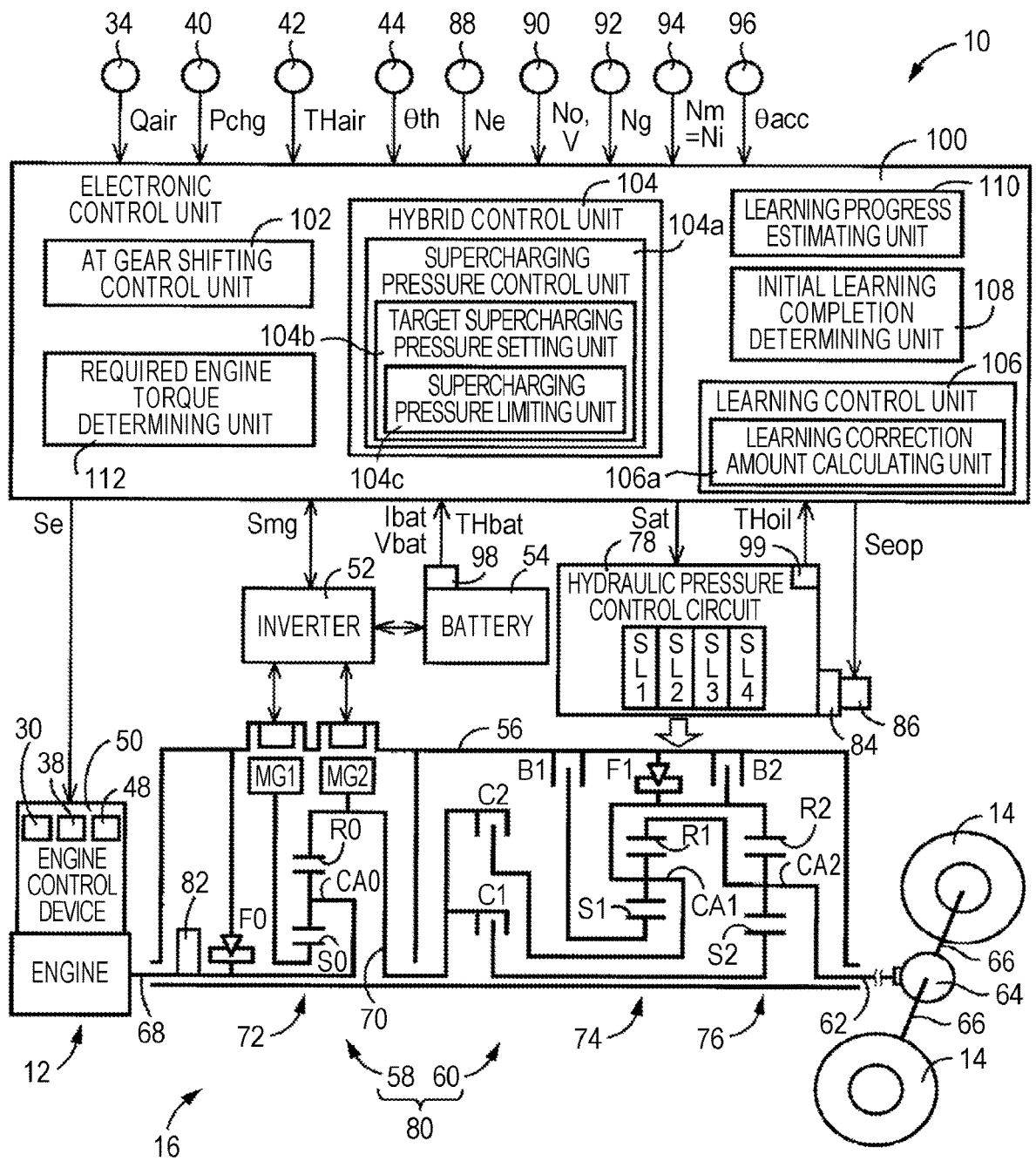
FIG. 1 is a diagram schematically illustrating a configuration of a vehicle to which a first embodiment of the disclosure is applied and illustrating principal parts of a control function and a control system for various types of control in the vehicle.

FIG. 1 is a diagram schematically illustrating a configuration of a vehicle 10 to which a first embodiment of the disclosure is applied and illustrating principal parts of a control system for various types of control in the vehicle 10. In FIG. 1, the vehicle 10 is a hybrid vehicle including an engine 12, a first rotary machine MG1, and a second rotary machine (rotary machine) MG2. The vehicle 10 also includes driving wheels 14 and a power transmission device 16 that is provided in a power transmission path between the engine 12 and the driving wheels 14.

Figures 2, 3:
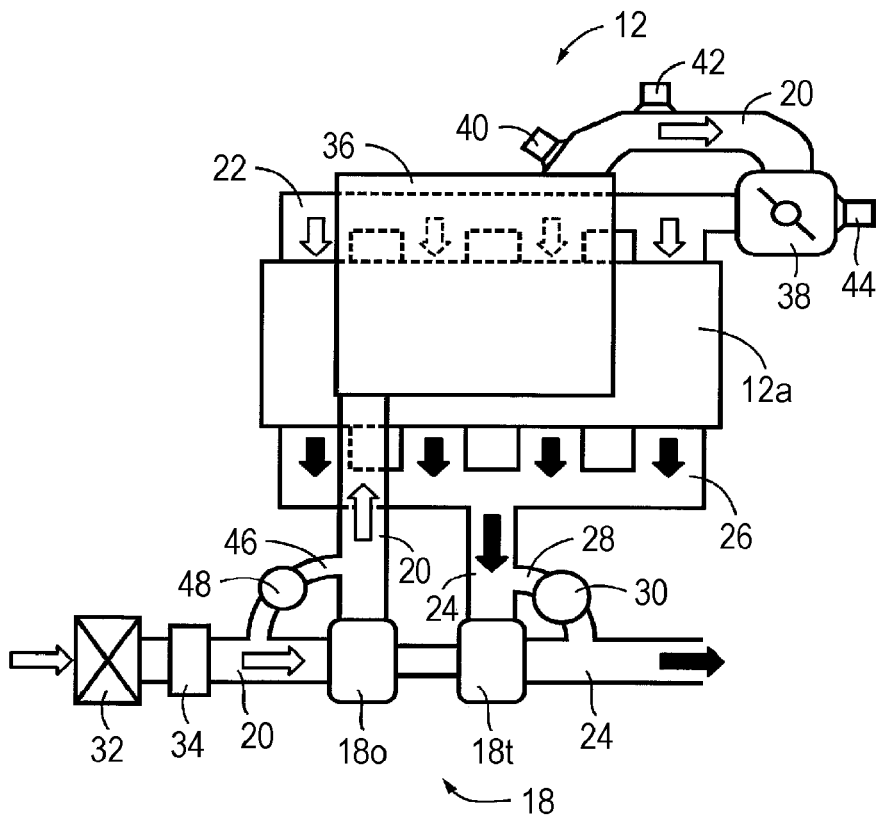
FIG. 2 is a diagram schematically illustrating a configuration of an engine which is mounted in the vehicle.
FIG. 3 is an operation table illustrating a relationship between combinations of a gear shifting operation of a mechanical stepped gear shifting unit illustrated in FIG. 1 and an operation of an engagement device which is used therein.

FIG. 2 is a diagram schematically illustrating a configuration of the engine 12. In FIG. 2, the engine 12 is a travel power source of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust turbine type supercharger, that is, an exhaust-turbine supercharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

An exhaust bypass 28 that causes exhaust gas to bypass the turbine 18t and to flow from upstream to downstream with respect to the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening of the waste gate valve 30 is continuously adjusted by causing an electronic control unit (a controller) 100 which is provided with the vehicle 10 and will be described later to operate an actuator which is not illustrated. As the valve opening of the waste gate valve 30 increases, exhaust gas of the engine 12 is more likely to be discharged via the exhaust bypass 28. Accordingly, in a supercharged state of the engine 12 in which a supercharging operation of the supercharger 18 is effective, a supercharging pressure Pchg from the supercharger 18 decreases as the valve opening of the waste gate valve 30 increases. The supercharging pressure Pchg from the supercharger 18 is a pressure of intake air and is an atmospheric pressure downstream from the compressor 18c in the intake pipe 20. A side in which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects a supercharging pressure Pchg from the supercharger 18 and an intake air temperature sensor 42 that detects an intake air temperature THair which is the temperature of intake air are provided in the intake pipe 20 between the intercooler 36 and the electronic throttle valve 38. A throttle valve opening sensor 44 that detects a throttle valve opening θth which is an opening of the electronic throttle valve 38 is provided in the vicinity of the electronic throttle valve 38, for example, in a throttle actuator.

An air recirculation bypass 46 that recirculates air to bypass the compressor 18c is provided in parallel in the intake pipe 20 from downstream to upstream with respect to the compressor 18c. For example, an air bypass valve (=ABV) 48 that is opened at the time of sudden closing of the electronic throttle valve 38 to curb occurrence of a surge and to protect the compressor 18c is provided in the air recirculation bypass 46. A valve opening of the air bypass valve 48 is continuously adjusted by causing the electronic control unit 100 which will be described later to operate an actuator which is not illustrated.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, the waste gate valve 30, or the air bypass valve 48.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque at a positive torque which is an acceleration side and is a regenerative torque at a negative torque which is a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

A power transmission device 16 includes an electrical stepless gear shifting unit 58 and a mechanical stepped gear shifting unit 60 which are disposed in series on a common axis in a case 56 which is a non-rotary member attached to the vehicle body. The electrical stepless gear shifting unit 58 is connected to the engine 12 directly or indirectly via a damper or the like which is not illustrated. The mechanical stepped gear shifting unit 60 is connected to an output side of the electrical stepless gear shifting unit 58. The power transmission device 16 includes a differential gear unit 64 that is connected to an output shaft 62 which is an output rotary member of the mechanical stepped gear shifting unit 60 and an axle 66 that is connected to the differential gear unit 64. In the power transmission device 16, power which is output from the engine 12 or the second rotary machine MG2 is transmitted to the mechanical stepped gear shifting unit 60 and is transmitted from the mechanical stepped gear shifting unit 60 to the driving wheels 14 via the differential gear unit 64 or the like. The power transmission device 16 having this configuration is used for a vehicle of a front-engine rear-drive (FR) type. In the following description, the electrical stepless gear shifting unit 58 is referred to as a stepless gear shifting unit 58 and the mechanical stepped gear shifting unit 60 is referred to as a stepped gear shifting unit 60. Power is synonymous with torque or force when not particularly distinguished. The stepless gear shifting unit 58, the stepped gear shifting unit 60, or the like is disposed to be substantially symmetric with respect to the common axis, and a lower half with respect to the axis is not illustrated in FIG. 1. The common axis is an axis of a crankshaft of the engine 12, a connection shaft 68 connected to the crankshaft, or the like.

The stepless gear shifting unit 58 includes the first rotary machine MG1 and a differential mechanism 72 which is a power split mechanism that mechanically splits power of the engine 12 to the first rotary machine MG1 and an intermediate transmission member 70 which is an output rotary member of the stepless gear shifting unit 58. The second rotary machine MG2 is connected to the intermediate transmission member 70 in a power-transmittable manner. The first rotary machine MG1 is a rotary machine to which power of the engine 12 is transmitted. Since the intermediate transmission member 70 is connected to the driving wheels 14 via the stepped gear shifting unit 60, the second rotary machine MG2 is a rotary machine that is connected to the driving wheels 14 in a power-transmittable manner. The stepless gear shifting unit 58 is an electrical stepless transmission in which a differential state of the differential mechanism 72 is controlled by controlling the operating state of the first rotary machine MG1. The first rotary machine MG1 is a rotary machine that can control an engine rotation speed Ne which is a rotation speed of the engine 12, for example, a rotary machine that can increase the engine rotation speed Ne. The power transmission device 16 transmits power of a power source to the driving wheels 14. Controlling the operating state of the first rotary machine MG1 corresponds to performing operation control of the first rotary machine MG1.

The differential mechanism 72 is constituted by a single-pinion type planetary gear unit and includes a sun gear S0, a carrier CA0, and a ring gear R0. The engine 12 is connected to the carrier CA0 via the connection shaft 68 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 72, the carrier CA0 serves as an input element, the sun gear S0 serves as a reaction element, and the ring gear R0 serves as an output element.

The stepped gear shifting unit 60 is an automatic transmission which is a stepped transmission constituting at least a part of a power transmission path between the intermediate transmission member 70 and the driving wheels 14, that is, a mechanical gear shifting mechanism constituting a part of a power transmission path between the stepless gear shifting unit 58 and the driving wheels 14. The intermediate transmission member 70 also serves as an input rotary member of the stepped gear shifting unit 60. Since the second rotary machine MG2 is connected to the intermediate transmission member 70 to rotate integrally or the engine 12 is connected to the input side of the stepless gear shifting unit 58, the stepped gear shifting unit 60 is a transmission constituting a part of the power transmission path between a power source (the second rotary machine MG2 or the engine 12) and the driving wheels 14. The intermediate transmission member 70 is a transmission member that transmits power of the power source to the driving wheels 14. The stepped gear shifting unit 60 is, for example, a known planetary gear type automatic transmission including a plurality of planetary gear units such as a first planetary gear unit 74 and a second planetary gear unit 76 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when they are not particularly distinguished from each other.

Each engagement device CB is a hydraulic frictional engagement device which is constituted by a multi-disc or single-disc clutch or brake which is pressed by a hydraulic actuator and a band brake which is tightened by a hydraulic actuator, or the like. The operating state such as an engaged state or a disengaged state of each engagement device CB is switched by adjusted hydraulic pressures Pc1, Pc2, Pb1, and Pb2 of the engagement device CB (see FIG. 6 which will be described later) which are output from a hydraulic pressure control circuit 78 provided in the vehicle 10.

In the stepped gear shifting unit 60, rotary elements of the first planetary gear unit 74 and the second planetary gear unit 76 are partially connected to each other directly or indirectly via the engagement device CB or the one-way clutch F1 or are connected to the intermediate transmission member 70, the case 56, or the output shaft 62. The rotary elements of the first planetary gear unit 74 are a sun gear S1, a carrier CA1, and a ring gear R1, and the rotary elements of the second planetary gear unit 76 area a sun gear S2, a carrier CA2, and a ring gear R2.

The stepped gear shifting unit 60 is a stepped transmission in which one gear stage out of a plurality of gear shifting stages (also referred to as gear stages) with different gear shifting ratios (also referred to as gear ratios) γat (=AT input rotation speed Ni/output rotation speed No) is formed, for example, by engagement of a predetermined engagement device which is one engagement device out of a plurality of engagement devices. That is, gear stages in the stepped gear shifting unit 60 are switched, that is, gear shifting is performed, by causing a plurality of engagement devices to selectively engage with each other. The stepped gear shifting unit 60 is a stepped automatic transmission in which each of a plurality of gear stages is formed. In the first embodiment, a gear stage which is formed in the stepped gear shifting unit 60 is referred to as an AT gear stage. The AT input rotation speed Ni is an input rotation speed of the stepped gear shifting unit 60 which is a rotation speed of the input rotary member of the stepped gear shifting unit 60 and has the same value as the rotation speed of the intermediate transmission member 70 and the same value as an MG2 rotation speed Nm which is the rotation speed of the second rotary machine MG2. The AT input rotation speed Ni can be expressed by the MG2 rotation speed Nm. The output rotation speed No is a rotation speed of the output shaft 62 which is an output rotation speed of the stepped gear shifting unit 60 and is also an output rotation speed of a composite transmission 80 which is a total transmission including the stepless gear shifting unit 58 and the stepped gear shifting unit 60. The composite transmission 80 is a transmission constituting a part of the power transmission path between the engine 12 and the driving wheels 14.

In the stepped gear shifting unit 60, as illustrated in an engagement operation table of FIG. 3, four forward AT gear stages including a first AT gear stage ("1st" in the drawing) to an AT fourth gear stage ("4th" in the drawing) are formed as a plurality of AT gear stages. The gear ratio γat of the first AT gear stage is the highest and the gear ratio γat becomes lower in higher AT gear stages. A reverse AT gear stage ("Rev" in the drawing) is formed, for example, by engagement of the clutch C1 and engagement of the brake B2. That is, as will be described later, for example, the first AT gear stage is formed at the time of reverse travel. The engagement operation table illustrated in FIG. 3 is obtained by collecting relationships between the AT gear stages and the operation states of the plurality of engagement devices. That is, the engagement operation table illustrated in FIG. 3 is obtained by collecting relationships between the AT gear stages and predetermined engagement devices which are engagement devices which are engaged in the AT gear stages. In FIG. 3, "O" denotes engagement, "Δ" denotes engagement at the time of engine braking or at the time of coast downshift of the stepped gear shifting unit 60, and a blank denotes disengagement.

In the stepped gear shifting unit 60, an AT gear stage which is formed according to a driver's operation of an accelerator or a vehicle speed V, or the like is switched, that is, a plurality of AT gear stages are selectively formed, by an electronic control unit 100 which will be described later. For example, in gear shifting control of the stepped gear shifting unit 60, gear shifting is performed by switching one of the engagement devices CB, that is, so-called clutch-to-clutch gear shifting in which gear shifting is performed by switching of the engagement device CB between engagement and disengagement is performed. In the first embodiment, for example, downshift from the second AT gear stage to the first AT gear stage is denoted by 2→1 downshift. The same is true of other upshift or downshift.

The vehicle 10 includes, for example, a one-way clutch F0, an MOP 82 which is a mechanical oil pump, and an EOP 84 which is an electrical oil pump.

The one-way clutch F0 is a lock mechanism that can fix the carrier CA0 to be non-rotatable. That is, the one-way clutch F0 is a lock mechanism that can fix the connection shaft 68 which is connected to the crankshaft of the engine 12 and which rotates integrally with the carrier CA0 to the case 56. In the one-way clutch F0, one member of two members that are rotatable relative to each other is integrally connected to the connection shaft 68 and the other member is integrally connected to the case 56. The one-way clutch F0 idles in a positive rotating direction which is a rotating direction at the time of operation of the engine 12 and is automatically engaged in a negative rotating direction which is opposite to that at the time of operation of the engine 12. Accordingly, at the time of idling of the one-way clutch F0, the engine 12 is rotatable relative to the case 56. On the other hand, at the time of engagement of the one-way clutch F0, the engine 12 is not rotatable relative to the case 56. That is, the engine 12 is fixed to the case 56 by engagement of the one-way clutch F0. In this way, the one-way clutch F0 permits rotation in the positive rotating direction of the carrier CA0 which is a rotating direction at the time of operation of the engine 12 and prohibits rotation in the negative rotating direction of the carrier CA0. That is, the one-way clutch F0 is a lock mechanism that can permit rotation in the positive rotating direction of the engine 12 and prohibit rotation in the negative rotating direction.

The MOP 82 is connected to the connection shaft 68, rotates with rotation of the engine 12, and ejects a hydraulic oil which is used for the power transmission device 16. The MOP 82 is rotated, for example, by the engine 12 to eject a hydraulic oil. The EOP 84 is rotated by a dedicated motor 86 for an oil pump provided in the vehicle 10 and ejects a hydraulic oil. The hydraulic oil which is ejected by the MOP 82 or the EOP 84 is supplied to the hydraulic pressure control circuit 78 (see FIG. 6 which will be described later). The operation states of the engagement devices CB are switched by the hydraulic pressures Pc1, Pc2, Pb1, and Pb2 which are adjusted by the hydraulic pressure control circuit 78 based on the hydraulic oil.

Figures 4, 5:
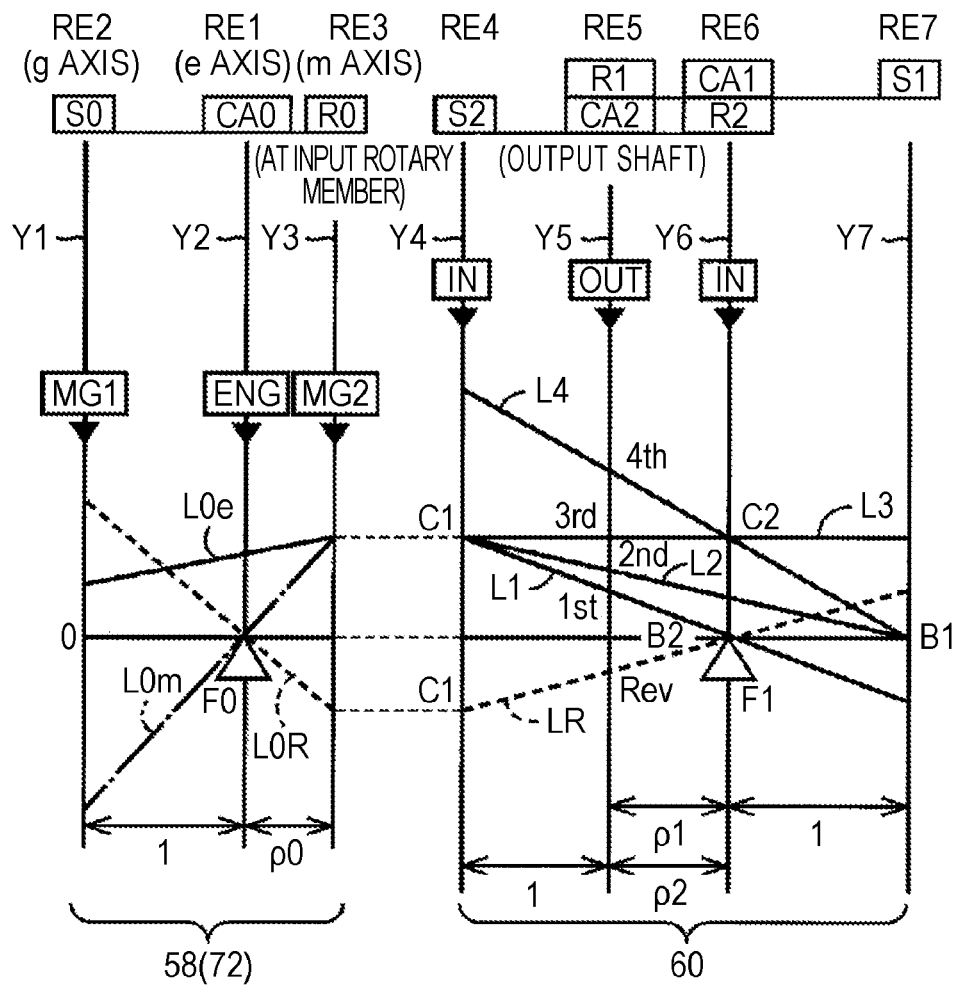
FIG. 4 is a diagram illustrating a relative relationship between rotation speeds of rotary elements in an electrical stepless gear shifting unit and the mechanical stepped gear shifting unit which are mounted in the vehicle.
FIG. 5 is a diagram illustrating an example of a gear stage allocation table in which a plurality of mock gear stages is allocated to a plurality of AT gear stages in the mechanical stepped gear shifting unit.

FIG. 4 is a diagram illustrating a relative relationship between rotation speeds of the rotary elements in the stepless gear shifting unit 58 and the stepped gear shifting unit 60. In FIG. 4, three vertical lines Y1, Y2, and Y3 corresponding to three rotary elements of the differential mechanism 72 constituting the stepless gear shifting unit 58 are a g axis indicating the rotation speed of the sun gear S0 corresponding to the second rotary element RE2, an e axis indicating the rotation speed of the carrier CA0 corresponding to the first rotary element RE1, and an m axis indicating the rotation speed of the ring gear R0 (that is, the input rotation speed of the stepped gear shifting unit 60) corresponding to the third rotary element RE3, respectively, sequentially from the left. Four vertical lines Y4, Y5, Y6, and Y7 of the stepped gear shifting unit 60 are axes indicating the rotation speed of the sun gear S2 corresponding to the fourth rotary element RE4, the rotation speed of the ring gear R1 and the carrier CA2 (that is, the rotation speed of the output shaft 62) connected to each other and corresponding to the fifth rotary element RE5, the rotation speed of the carrier CA1 and the ring gear R2 connected to each other and corresponding to the sixth rotary element RE6, and the rotation speed of the sun gear S1 corresponding to the seventh rotary element RE7, respectively, sequentially from the left. The gaps between the vertical lines Y1, Y2, and Y3 are determined according to a gear ratio $\rho 0$ of the differential mechanism 72. The gaps between the vertical lines Y4, Y5, Y6, and Y7 are determined according to gear ratios $\rho 1$ and $\rho 2$ of the first planetary gear unit 74 and the second planetary gear unit 76. In the relationship between the vertical axes in the diagram, when the gap between a sun gear and a carrier corresponds to "1," the gap between the carrier and a ring gear corresponds to a gear ratio $\rho$ of a planetary gear unit (=number of teeth of the sun gear/ number of teeth of the ring gear).

With reference to the diagram illustrated in FIG. 4, in the differential mechanism 72 of the stepless gear shifting unit 58, the engine 12 (see "ENG" in the drawing) is connected to the first rotary element RE1, the first rotary machine MG1 (see "MG1" in the drawing) is connected to the second rotary element RE2, the second rotary machine MG2 (see "MG2" in the drawing) is connected to the third rotary element RE3 which rotates integrally with the intermediate transmission member 70, and rotation of the engine 12 is transmitted to the stepped gear shifting unit 60 via the intermediate transmission member 70. In the stepless gear shifting unit 58, a relationship between the rotation speed of the sun gear S0 and the rotation speed of the ring gear R0 is represented by the straight lines L0e, L0m, and L0R crossing the vertical line Y2.

In the stepped gear shifting unit 60, the fourth rotary element RE4 is selectively connected to the intermediate transmission member 70 via the clutch C1, the fifth rotary element RE5 is connected to the output shaft 62, the sixth rotary element RE6 is selectively connected to the intermediate transmission member 70 via the clutch C2 and selectively connected to the case 56 via the brake B2, and the seventh rotary element RE7 is selectively connected to the case 56 via the brake B1. In the stepped gear shifting unit 60, the rotation speeds of "1st," "2nd," "3rd," "4th," and "Rev" in the output shaft 62 are denoted by the straight lines L1, L2, L3, L4, and LR crossing the vertical line Y5 through engagement/disengagement control of the engagement devices CB.

The straight line L0e and the straight lines L1, L2, L3, and L4 which are indicated by solid lines in FIG. 4 denote relative speeds of the rotary elements at the time of forward travel in a hybrid travel (=HV travel) mode in which hybrid travel using at least the engine 12 as a power source is possible. In the hybrid travel mode, in the differential mechanism 72, when an MG1 torque Tg which is a reaction torque is input to the sun gear S0 as a negative torque of the first rotary machine MG1 with respect to an engine torque Te which is input to the carrier CA0 as a positive torque, a direct engine-transmitted torque Td $(=Te/(1+\rho 0)=-(1/\rho 0)\times Tg)$ which is a positive torque at the time of forward rotation appears in the ring gear R0. A combined torque of the direct engine-transmitted torque Td and the MG2 torque Tm is transmitted as a drive torque in the forward direction of the vehicle 10 to the driving wheels 14 via the stepped gear shifting unit 60 in which one AT gear stage out of the first AT gear stage to the fourth AT gear stage is formed according to a required driving force. The first rotary machine MG1 serves as a power generator when a negative torque is generated at the time of positive rotation. A generated electric power Wg of the first rotary machine MG1 charges the battery 54 or is consumed in the second rotary machine MG2. The second rotary machine MG2 outputs the MG2 torque Tm using all or some of the generated electric power Wg or electric power from the battery 54 in addition to the generated electric power Wg.

The straight line L0m indicated by an alternate long and short dash line in FIG. 4 and the straight lines L1, L2, L3, and L4 indicated by solid lines in FIG. 4 denote relative speeds of the rotary elements at the time of forward travel in a motor-driven travel (=EV travel) mode in which motor-driven travel using at least one rotary machine of the first rotary machine MG1 and the second rotary machine MG2 as a power source in a state in which the operation of the engine 12 is stopped is possible. The motor-driven travel at the time of forward travel in the motor-driven travel mode includes, for example, single-motor-driven travel using only the second rotary machine MG2 as a power source and two-motor-driven travel using both the first rotary machine MG1 and the second rotary machine MG2 as a power source. In the single-motor-driven travel, the carrier CA0 does not rotate and the MG2 torque Tm which is a positive torque at the time of positive rotation is input to the ring gear R0. At this time, the first rotary machine MG1 connected to the sun gear S0 enters a no-load state and idles at the time of negative rotation. In the single-motor-driven travel, the one-way clutch F0 is disengaged and the connection shaft 68 is not fixed to the case 56. In the two-motor-driven travel, when the MG1 torque Tg which is a negative torque at the time of negative rotation is input to the sun gear S0 in a state in which the carrier CA0 does not rotate, the one-way clutch F0 is automatically engaged such that rotation in the negative rotating direction of the carrier CA0 is prohibited. In the state in which the carrier CA0 is fixed not to be rotatable by engagement of the one-way clutch F0, a reaction torque based on the MG1 torque Tg is input to the ring gear R0. In the two-motor-driven travel, similarly to the single-motor-driven travel, the MG2 torque Tm is input to the ring gear R0. When the MG1 torque Tg which is a negative torque at the time of negative rotation is input to the sun gear S0 in a state in which the carrier CA0 does not rotate and the MG2 torque Tm is not input thereto, the single-motor-driven travel using the MG1 torque Tg is also possible. In forward travel in the motor-driven travel mode, the engine 12 is not driven, the engine rotation speed Ne is zero, and at least one torque of the MG1 torque Tg and the MG2 torque Tm is transmitted as a drive torque in the forward travel direction of the vehicle 10 to the driving wheels 14 via the stepped gear shifting unit 60 in which one AT gear stage out of the first AT gear stage to the AT fourth gear stage is formed. In forward travel in the motor-driven travel mode, the MG1 torque Tg is a powering torque which is a negative torque at the time of negative rotation and the MG2 torque Tm is a powering torque which is a positive torque at the time of positive rotation.

The straight line L0R and the straight line LR indicated by dotted lines in FIG. 4 denote relative speeds of the rotary elements at the time of reverse travel in the motor-driven travel mode. In the reverse travel in the motor-driven travel mode, an MG2 torque Tm which is a negative torque at the time of negative rotation is input to the ring gear R0 and the MG2 torque Tm is transmitted as a drive torque in the reverse travel direction of the vehicle 10 to the driving wheels 14 via the stepped gear shifting unit 60 in which the first AT gear stage is formed. In the vehicle 10, by outputting an MG2 torque Tm for reverse travel of which the signs are opposite to the MG2 torque Tm for forward travel at the time of forward travel from the second rotary machine MG2, for example, in a state in which the first AT gear stage which is a low-side AT gear stage for forward travel out of a plurality of AT gear stages is formed by the electronic control unit 100 which will be described later, it is possible to perform reverse travel. In the reverse travel in the motor-driven travel mode, the MG2 torque Tm is a powering torque which is a negative torque at the time of negative rotation. In the hybrid travel mode, since the second rotary machine MG2 can be negatively rotated as indicated by the straight line L0R, it is possible to perform reverse travel as in the motor-driven travel mode.

In the power transmission device 16, the stepless gear shifting unit 58 includes the differential mechanism 72 including three rotary elements such as the carrier CA0 serving as the first rotary element RE1 that is connected to the engine 12 in a power-transmittable manner, the sun gear S0 serving as the second rotary element RE2 that is connected to the first rotary machine MG1 in a power-transmittable manner, and the ring gear R0 serving as the third rotary element RE3 that is connected to the intermediate transmission member 70, and is constituted as an electrical gear shifting mechanism in which a differential state of the differential mechanism 72 is controlled by controlling the operating state of the first rotary machine MG1. In other words, the third rotary element RE3 that is connected to the intermediate transmission member 70 is a third rotary element RE3 that is connected to the second rotary machine MG2 in a power-transmittable manner. That is, in the power transmission device 16, the stepless gear shifting unit 58 which includes the differential mechanism 72 that is connected to the engine 12 in a power-transmittable manner and the first rotary machine MG1 that is connected to the differential mechanism 72 in a power-transmittable manner and in which the differential state of the differential mechanism 72 is controlled by controlling the operating state of the first rotary machine MG1 is constituted. The stepless gear shifting unit 58 serves as an electrical stepless transmission in which a gear ratio $\gamma 0$ (=Ne/Nm) which is a value of a ratio of the engine rotation speed Ne which has the same value as the rotation speed of the connection shaft 68 serving as an input rotary member to an MG2 rotation speed Nm which is the rotation speed of the intermediate transmission member 70 serving as an output rotary member changes.

For example, in the hybrid travel mode, when the rotation speed of the sun gear S0 increases or decreases by controlling the rotation speed of the first rotary machine MG1 with respect to the rotation speed of the ring gear R0 which is constrained to rotation of the driving wheels 14 with formation of an AT gear stage in the stepped gear shifting unit 60, the rotation speed of the carrier CA0, that is, the engine rotation speed Ne, increases or decreases. Accordingly, in hybrid travel, the engine 12 can operate at an engine operating point Peng with high efficiency. The operating point is an operating point which is expressed by a rotation speed and a torque, and the engine operating appoint Peng is an operating point of the engine 12 which is expressed by the engine rotation speed Ne and the engine torque Te. In the power transmission device 16, the composite transmission 80 in which the stepless gear shifting unit 58 and the stepped gear shifting unit 60 are arranged in a series as a whole can constitute a stepless transmission with the stepped gear shifting unit 60 in which an AT gear stage is formed and the stepless gear shifting unit 58 which operates as a stepless transmission.

Alternatively, since the stepless gear shifting unit 58 can also perform gear shifting like the stepped transmission, the composite transmission 80 including the stepped gear shifting unit 60 in which an AT gear stage is formed and the stepless gear shifting unit 58 that performs gear shifting like a stepped transmission as a whole in the power transmission device 16 can perform gear shifting like a stepped transmission. That is, in the composite transmission 80, the stepped gear shifting unit 60 and the stepless gear shifting unit 58 can be controlled such that a plurality of gear stages with different gear ratios $\gamma t$ (=Ne/No) which indicates a value of a ratio of the engine rotation speed Ne to the output rotation speed No. In the first embodiment, a gear stage which is formed in the composite transmission 80 is referred to as a mock gear stage. The gear ratio $\gamma t$ is a total gear ratio which is formed by the stepless gear shifting unit 58 and the stepped gear shifting unit 60 which are arranged in series and has a value ($\gamma t = \gamma 0 \times \gamma at$) which is obtained by multiplying the gear ratio $\gamma 0$ of the stepless gear shifting unit 58 and the gear ratio $\gamma at$ of the stepped gear shifting unit 60.

For example, the mock gear stages are allocated to each AT gear stage of the stepped gear shifting unit 60 such that one or more types of mock gear stages are formed by combination of the AT gear stages of the stepped gear shifting unit 60 and a plurality of types of gear ratio $\gamma 0$ of the stepless gear shifting unit 58. For example, FIG. 5 illustrates an example of a gear stage allocation table. In FIG. 5, in upshift of the composite transmission 80, it is determined in advance that mock first to third gear stages are formed for the first AT gear stage, mock fourth to sixth gear stages are formed for the second AT gear stage, mock seventh to ninth gear stages are formed for the third AT gear stage, and a mock tenth gear stage is formed for the fourth AT gear stage. In downshift of the composite transmission 80, it is determined in advance that first to second mock gear stages are formed for the first AT gear stage, third to fifth mock gear stages are formed for the second AT gear stage, sixth to eighth mock gear stages are formed for the third AT gear stage, and ninth to tenth mock gear stages are formed for the fourth AT gear stage. In the composite transmission 80, different mock gear stages are formed at a certain AT gear stage by controlling the stepless gear shifting unit 58 such that the engine rotation speed Ne capable of realizing a predetermined gear ratio γt with respect to the output rotation speed No is obtained. In the composite transmission 80, the mock gear stage is switched by controlling the stepless gear shifting unit 58 according to switching of the AT gear stage. In FIG. 5, an example in which the mock gear stages which are allocated to the AT gear stages vary in upshift and downshift is illustrated, but the same mock gear stages may be allocated.

Referring back to FIG. 1, the vehicle 10 includes an electronic control unit 100 in the controller for the vehicle 10 associated with control of the engine 12, the stepless gear shifting unit 58, the stepped gear shifting unit 60, and the like. Accordingly, FIG. 1 is a diagram illustrating an input and output system of the electronic control unit 100 and is a functional block diagram illustrating principal parts of the control function of the electronic control unit 100. The electronic control unit 100 is configured to include a so-called microcomputer including, for example, a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity.

The electronic control unit 100 is supplied with various signals (for example, an intake air amount Qair, a supercharging pressure Pchg, an intake air temperature THair, a throttle valve opening θth, an engine rotation speed Ne, an output rotation speed No corresponding to a vehicle speed V, an MG1 rotation speed Ng which is the rotation speed of the first rotary machine MG1, an MG2 rotation speed Nm with the same value as the AT input rotation speed Ni, an accelerator opening θacc which is an accelerator operation amount by a driver indicating the magnitude of the driver's acceleration operation, a battery temperature THbat, a battery charging/discharging current Ibat, and a battery voltage Vbat of the battery 54, and a hydraulic oil temperature THoil which is the temperature of a hydraulic oil) based on detection values from various sensors (for example, the air flowmeter 34, the supercharging pressure sensor 40, the intake air temperature sensor 42, the throttle valve opening sensor 44, the engine rotation speed sensor 88, the output rotation speed sensor 90, the MG1 rotation speed sensor 92, the MG2 rotation speed sensor 94, the accelerator opening sensor 96, the battery sensor 98, and the oil temperature sensor 99) which are provided in the vehicle 10.

The electronic control unit 100 outputs various command signals (for example, an engine control command signal Se for controlling the engine 12, a rotary machine control command signal Smg for controlling the first rotary machine MG1 and the second rotary machine MG2, a hydraulic pressure control command signal Sat for controlling the operating state of the engagement device CB, and an EOP control command signal Seop for controlling the operation of the EOP 84) to various devices (for example, the engine control device 50, the inverter 52, the hydraulic pressure control circuit 78, and the motor 86) which are provided in the vehicle 10. The hydraulic pressure control command signal Sat is also a hydraulic pressure control command signal for controlling gear shifting of the stepped gear shifting unit 60 and is also, for example, a command signal for driving solenoid valves SL1 to SL4 (see FIG. 6 which will be described later) that adjust hydraulic pressures Pc1, Pc2, Pb1, and Pb2 which are supplied to hydraulic actuators of the engagement devices CB. The electronic control unit 100 sets hydraulic pressure instruction values corresponding to the values of the hydraulic pressures Pc1, Pc2, Pb1, and Pb2 and outputs driving currents or driving voltages corresponding to the hydraulic pressure instruction values to the hydraulic pressure control circuit 78.

The electronic control unit 100 calculates a state of charge (SOC) value SOC [%] which is a value indicating the state of charge of the battery 54, for example, based on the battery charging/discharging current That and the battery voltage Vbat. The electronic control unit 100 calculates chargeable and dischargeable powers Win and Wout for defining a usage range of the battery power Pbat which is the power of the battery 54, for example, based on the battery temperature THbat and the SOC value SOC of the battery 54. The chargeable and dischargeable powers Win and Wout include a chargeable power Win which is a possible input power for defining limitation of an input power of the battery 54 and a dischargeable power Wout which is a possible output power for defining limitation of an output power of the battery 54. For example, the chargeable and dischargeable powers Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the SOC value SOC increases in an area in which the SOC value SOC is high. For example, the dischargeable power Wout decreases as the SOC value SOC decreases in an area in which the SOC value SOC is low.

Figure 6:
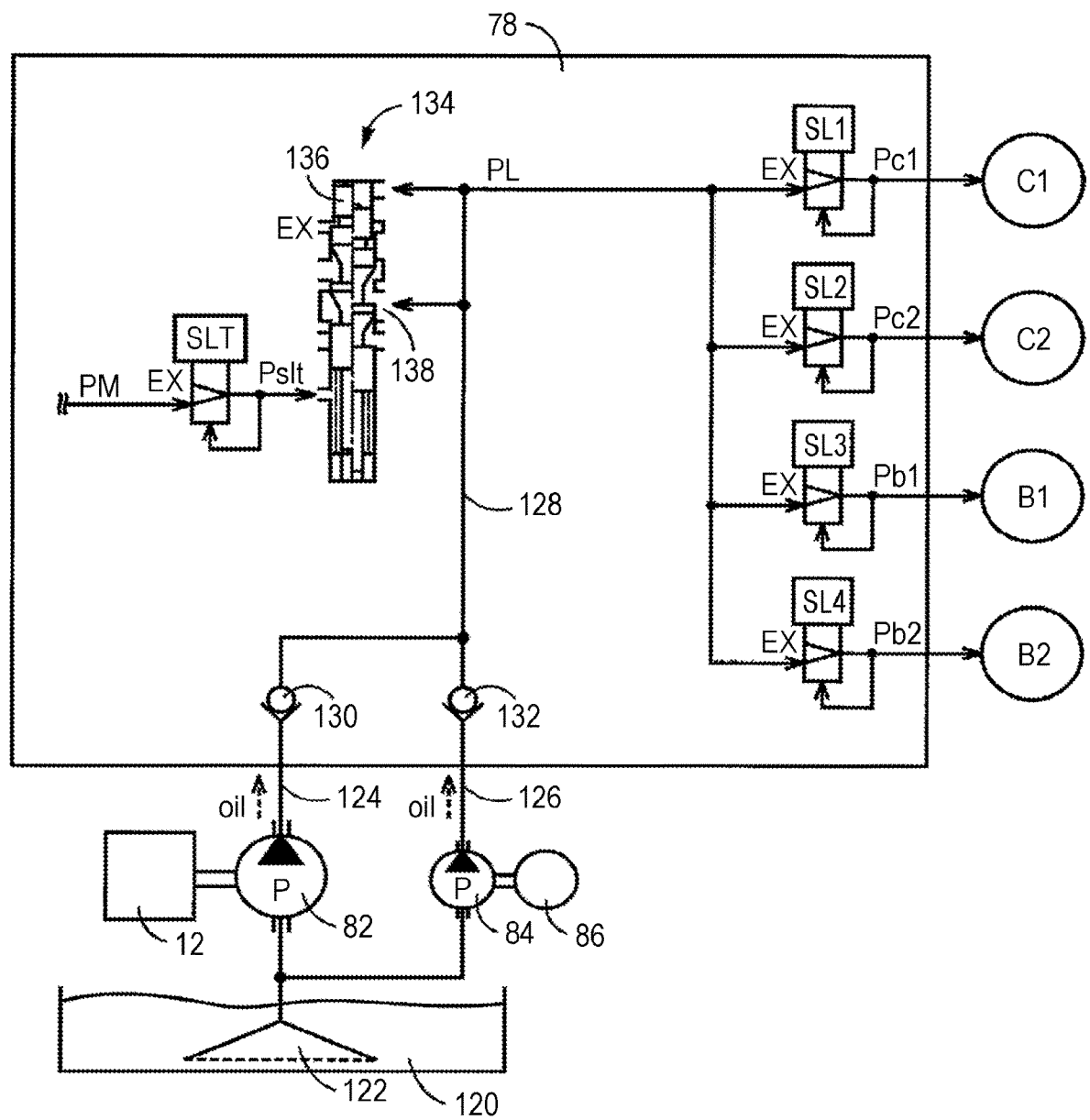
FIG. 6 is a diagram illustrating a hydraulic pressure control circuit of a power transmission device which is mounted in the vehicle and illustrating a hydraulic pressure source which supplies a hydraulic oil to the hydraulic pressure control circuit.

FIG. 6 is a diagram illustrating the hydraulic pressure control circuit 78 and is a diagram illustrating a hydraulic pressure source that supplies a hydraulic oil to the hydraulic pressure control circuit 78. In FIG. 6, the MOP 82 and the EOP 84 are provided in parallel in the structure of an oil passage in which the hydraulic oil flows. The MOP 82 and the EOP 84 eject a hydraulic oil serving as a source of a hydraulic pressure for switching the operating states of the engagement devices CB or supplying a lubricant to the units of the power transmission device 16. The MOP 82 and the EOP 84 suction up a hydraulic oil circulating to an oil pan 120 which is provided in a lower part of the case 56 via a strainer 122 which is a common inlet and eject the hydraulic oil to ejection oil passages 124 and 126. The ejection oil passages 124 and 126 are connected to an oil passage of the hydraulic pressure control circuit 78, for example, a line-pressure oil passage 128 as an oil passage in which a line pressure PL flows. The ejection oil passage 124 to which the hydraulic oil is ejected from the MOP 82 is connected to the line-pressure oil passage 128 via an MOP check valve 130 which is provided in the hydraulic pressure control circuit 78. The ejection oil passage 126 to which the hydraulic oil is ejected from the EOP 84 is connected to the line-pressure oil passage 128 via an EOP check valve 132 which is provided in the hydraulic pressure control circuit 78. The MOP 82 rotates along with the engine 12 and is rotationally driven by the engine 12 to generate a hydraulic oil pressure. The EOP 84 is rotationally driven by the motor 86 regardless of the rotating state of the engine 12 to generate a hydraulic oil pressure. The EOP 84 operates, for example, at the time of travel in the motor-driven travel mode.

The hydraulic pressure control circuit 78 includes a regulator valve 134 and the solenoid valves SLT and SL1 to SL4 in addition to the line-pressure oil passage 128, the MOP check valve 130, and the EOP check valve 132.

The regulator valve 134 regulates the line pressure PL based on the hydraulic oil which is ejected from at least one of the MOP 82 and the EOP 84. The solenoid valve SLT is, for example, a linear solenoid valve and is controlled by the electronic control unit 100 such that a pilot pressure Pslt based on an accelerator opening θacc, an input torque of the stepped gear shifting unit 60, or the like is input to the regulator valve 134. In the regulator valve 134, a spool 136 is biased by the pilot pressure Pslt and the spool 136 moves in an axial direction with change in an opening area of a discharge flow passage 138, whereby the line pressure PL is regulated based on the pilot pressure Pslt. Accordingly, the line pressure PL is a hydraulic pressure based on the accelerator opening θacc, the input torque of the stepped gear shifting unit 60, or the like. A source pressure which is input to the solenoid valve SLT is a modulator pressure PM which is regulated to a constant value by a modulator valve which is not illustrated, for example, using the line pressure PL as a source pressure.

The solenoid valves SL1 to SL4 are, for example, linear solenoid valves and is controlled by the electronic control unit 100 such that the hydraulic pressures Pc1, Pc2, Pb1, and Pb2 of the engagement devices CB are output using the line pressure PL supplied via the line-pressure oil passage 128 as a source pressure. The solenoid valve SL1 regulates a C1 hydraulic pressure Pc1 which is supplied to a hydraulic actuator of the clutch C1. The solenoid valve SL2 regulates a C2 hydraulic pressure Pc2 which is supplied to a hydraulic actuator of the clutch C2. The solenoid valve SL3 regulates a B1 hydraulic pressure Pb1 which is supplied to a hydraulic actuator of the brake B1. The solenoid valve SL4 regulates a B2 hydraulic pressure Pb2 which is supplied to a hydraulic actuator of the brake B2.

Referring back to FIG. 1, the electronic control unit 100 includes an AT gear shifting control unit 102, a hybrid control unit 104, a learning control unit 106, an initial learning completion determining unit 108, a learning progress estimating unit 110, and a required engine torque determining unit 112 in order to realize various types of control in the vehicle 10.

The AT gear shifting control unit 102 performs determination of gear shifting of the stepped gear shifting unit 60, for example, using an AT gear stage shifting map which is a relationship which is acquired in advance by experiment or design and stored, that is, a predetermined relationship, and performs gear shifting control of the stepped gear shifting unit 60 according to necessity. The AT gear shifting control unit 102 outputs a hydraulic pressure control command signal Sat for switching between engagement and disengagement of the engagement devices CB using the solenoid valves SL1 to SL4 to the hydraulic pressure control circuit 78 such that the AT gear stage of the stepped gear shifting unit 60 is automatically switched in gear shifting control of the stepped gear shifting unit 60. The AT gear stage shifting map is, for example, a predetermined relationship in which gear shifting lines for determining gear shifting of the stepped gear shifting unit 60 are arranged on a two-dimensional coordinate system with the output rotation speed No and the accelerator opening θacc as variables. Here, the vehicle speed V or the like may be used instead of the output rotation speed No or a required drive torque Twdem, a throttle valve opening θth, or the like may be used instead of the accelerator opening θacc. The gear shifting lines in the AT gear stage shifting map are an upshift line for determining upshift and a downshift line for determining downshift. Each gear shifting line is for determining whether the output rotation speed No crosses the line indicating the accelerator opening θacc or whether the accelerator opening θacc crosses a line indicating a certain output rotation speed No, that is, whether the accelerator opening θacc crosses a gear shifting point which is a value at which gear shifting on the gear shifting line is to be performed, and is determined in advance as continuity of such gear shifting points.

Te hybrid control unit 104 has a function of an engine control unit that controls the operation of the engine 12 and a function of a rotary machine control unit that controls the operations of the first rotary machine MG1 and the second rotary machine MG2 via the inverter 52, and performs hybrid drive control or the like using the engine 12, the first rotary machine MG1, and the second rotary machine MG2 based on such control functions.

The hybrid control unit 104 calculates a required drive torque Twdem which is a drive torque Tw required for the vehicle 10 by applying the accelerator opening θacc and the vehicle speed V to, for example, a driving force map which is a predetermined relationship. In other words, the required drive torque Twdem is a required drive power Pwdem at the vehicle speed V at that time. Here, the output rotation speed No or the like may be used instead of the vehicle speed V. The hybrid control unit 104 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required for the battery 54, the like. For example, the engine control command signal Se is a command value of an engine power Pe which is the power of the engine 12 that outputs the engine torque Te at the engine rotation speed Ne at that time. The rotary machine control command signal Smg is, for example, a command value of a generated electric power Wg of the first rotary machine MG1 that outputs the MG1 torque Tg at the MG1 rotation speed Ng at the time of outputting the command as a reaction torque of the engine torque Te and is a command value of power consumption Wm of the second rotary machine MG2 that outputs the MG2 torque Tm at the MG2 rotation speed Nm at the time of outputting the command.

For example, when the stepless gear shifting unit 58 operates as a stepless transmission and the composite transmission 80 as a whole operates as a stepless transmission, the hybrid control unit 104 controls the engine 12 such that the required engine power Pedem in consideration of the required charging/discharging power or the charging/discharging efficiency in the battery 54, or the like in addition to the required drive power Pwdem is realized and an engine power Pe for outputting a target engine torque Tetgt at a target engine rotation speed Netgt in consideration of an optimal engine operating point Pengf or the like is achieved. The hybrid control unit 104 performs stepless gear shifting control of the stepless gear shifting unit 58 to change the gear ratio γ0 of the stepless gear shifting unit 58 by controlling the generated electric power Wg of the first rotary machine MG1 such that the MG1 torque Tg for causing the engine rotation speed Ne to approach the target engine rotation speed Netgt is output. As the result of such control, the gear ratio γt of the composite transmission 80 when it operates as a stepless transmission is controlled. The MG1 torque Tg when the composite transmission 80 as a whole operates as a stepless transmission is calculated, for example, in feedback control in which the first rotary machine MG1 operates such that the engine rotation speed Ne approaches the target engine rotation speed Netgt. The MG2 torque Tm when the composite transmission 80 as a whole operates as a stepless transmission is calculated such that the required drive torque Twdem is obtained in conjunction with the drive torque Tw based on the direct engine-transmitted torque Td.

The optimal engine operating point Pengf is determined in advance, for example, as an engine operating point Peng at which total fuel efficiency in the vehicle 10 in consideration of charging/discharging efficiency in the battery 54 in addition to fuel efficiency of only the engine 12 is best when a required engine power Pedem is realized. The target engine rotation speed Netgt is a target value of the engine rotation speed Ne, and the target engine torque Tetgt is a target value of the engine torque Te.

Figure 7:
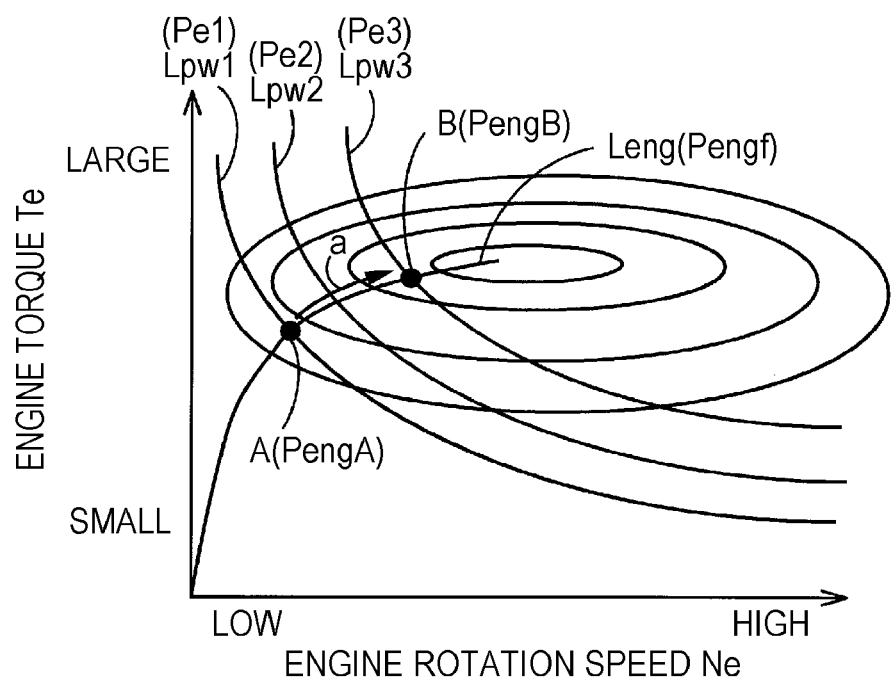
FIG. 7 is a diagram illustrating an example of an optimal engine operating point of the engine.

FIG. 7 is a diagram illustrating an example of the optimal engine operating point Pengf on a two-dimensional coordinate system with the engine rotation speed Ne and the engine torque Te as variables. In FIG. 7, a solid line Leng denotes a group of optimal engine operating points Pengf. Equipower lines Lpw1, Lpw2, and Lpw3 denote examples in which the required engine power Pedem is required engine powers Pe1, Pe2, and Pe3, respectively. A point A is an engine operating point PengA when the required engine power Pe1 is realized on the optimal engine operating point Pengf, and a point B is an engine operating point PengB when the required engine power Pe3 is realized on the optimal engine operating point Pengf. The points A and B are also target values of the engine operating point Peng which is expressed by the target engine rotation speed Netgt and the target engine torque Tetgt, that is, a target engine operating point Pengtgt. For example, when the target engine operating point Pengtgt changes from the point A to the point B with an increase in the accelerator opening θacc, the engine operating point Peng is controlled such that it changes to a path passing through the optimal engine operating point Pengf.

For example, when the stepless gear shifting unit 58 performs gear shifting like a stepped transmission and the composite transmission 80 as a whole performs gear shifting like a stepped transmission, the hybrid control unit 104 determines gear shifting of the composite transmission 80, for example, using a mock gear stage shifting map which is a predetermined relationship and performs gear shifting control of the stepless gear shifting unit 58 such that a plurality of mock gear stages is selectively formed in cooperation with gear shifting control of the AT gear stages of the stepped gear shifting unit 60 which is performed by the AT gear shifting control unit 102. A plurality of mock gear stages can be formed by controlling the engine rotation speed Ne using the first rotary machine MG1 based on the output rotation speed No such that the gear ratios γt thereof can be maintained. The gear ratio γt of each mock gear stage does have to be constant in the overall range of the output rotation speed No and may be changed in a predetermined range or may be limited to an upper limit or a lower limit of the rotation speed of each part. The plurality of mock gear stages has only to control the engine rotation speed Ne based on the output rotation speed No and a predetermined mock gear stage can be formed regardless of the types of the AT gear stages of the stepped gear shifting unit 60. In this way, the hybrid control unit 104 can perform gear shifting control such that the engine rotation speed Ne changes like stepped gear shifting.

Figure 8:
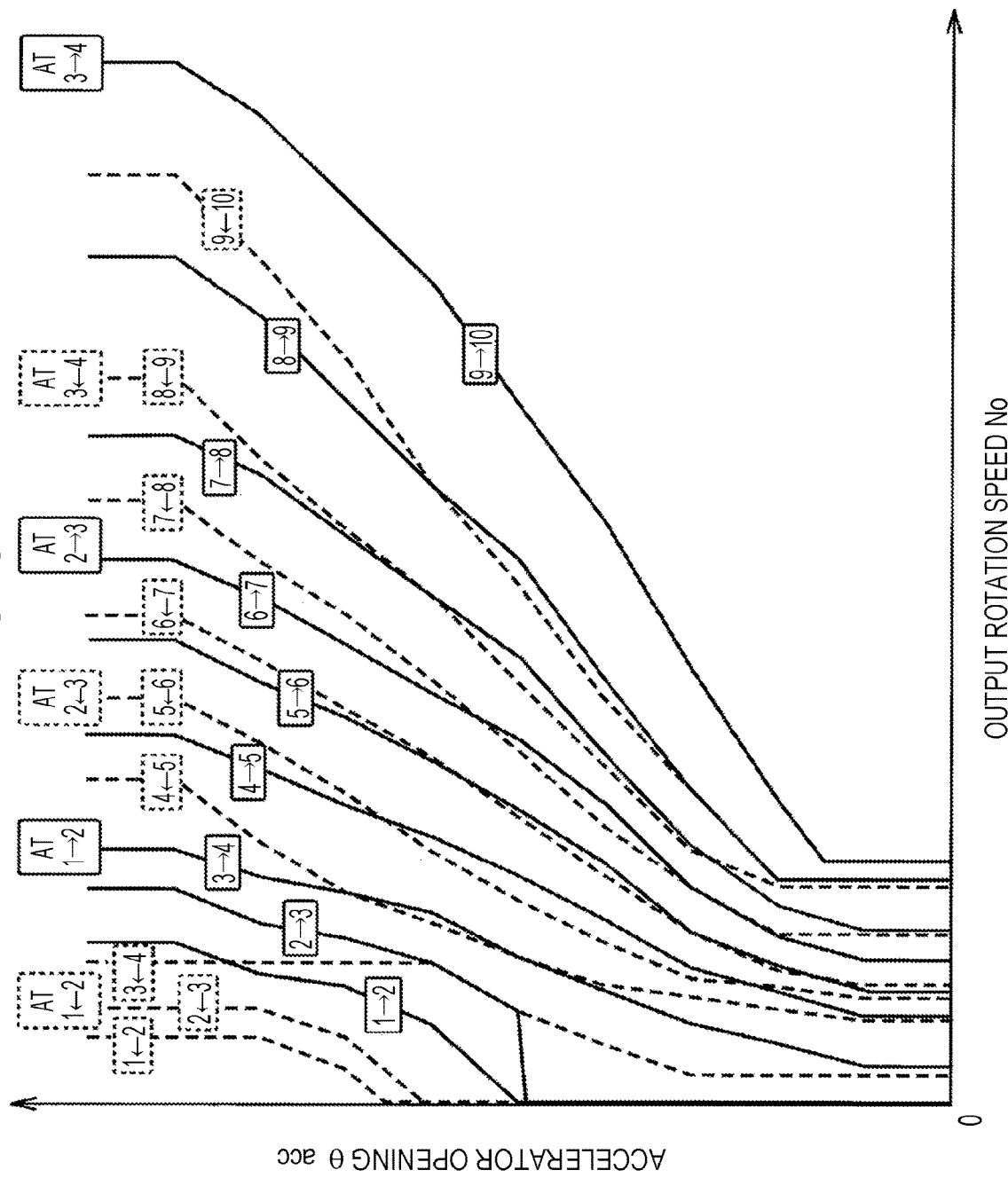
FIG. 8 is a diagram illustrating an example of a mock gear stage shifting map which is used for gear shifting control of a plurality of mock gear stages.

The mock gear stage shifting map is determined in advance using the output rotation speed No and the accelerator opening θacc as parameters similarly to the AT gear stage shifting map. FIG. 8 illustrates an example of the mock gear stage shifting map, where solid lines are upshift lines and dotted lines are downshift lines. By switching between the mock gear stage according to the mock gear stage shifting map, the same feeling of gear shifting as in a stepped transmission is obtained in the composite transmission 80 in which the stepless gear shifting unit 58 and the stepped gear shifting unit 60 are arranged in series as a whole. In mock stepped gear shifting control in which the composite transmission 80 as a whole performs gear shifting like a stepped transmission, the mock stepped gear shifting control has only to be performed in preference to stepless gear shifting control in which the composite transmission 80 as a whole operates as a stepless transmission, for example, when a travel mode in which travel performance has priority such as a sports travel mode is selected by a driver or when the required drive torque Twdem is relatively great, but the mock stepped gear shifting control may be basically performed except for a predetermined execution limiting time.

The mock stepped gear shifting control by the hybrid control unit 104 and the gear shifting control of the stepped gear shifting unit 60 by the AT gear shifting control unit 102 are performed in cooperation. In the first embodiment, ten types of mock gear stages including the first mock gear stage to the mock tenth gear stage are allocated to four types of AT gear stages including the first AT gear stage to the fourth AT gear stage. Accordingly, the AT gear stage shifting map is determined such that gear shifting of an AT gear stage is performed at the same time as gear shifting of the mock gear stages. Specifically, the upshift lines "3→4," "6→7," and "9→10" of the mock gear stages in FIG. 8 match the upshift lines "1→2," "2→3," and "3→4" in the AT gear stage shifting map (see "AT 1→2" and the like in FIG. 8). The upshift lines "2→3," "5→6," and "8→9" of the mock gear stages in FIG. 8 match the downshift lines "1←2," "2←3," and "3←4" in the AT gear stage shifting map (see "AT 1←2" and the like in FIG. 8). Alternatively, a gear shifting command for the AT gear stages may be output to the AT gear shifting control unit 102 based on a result of determination of gear shifting of a mock gear stage using the mock gear stage shifting map illustrated in FIG. 8. In this way, upshift of the composite transmission 80 as a whole is performed at the time of upshift of the stepped gear shifting unit 60, and downshift of the composite transmission 80 as a whole is performed at the time of downshift of the stepped gear shifting unit 60. The AT gear shifting control unit 102 performs switching of the AT gear stage of the stepped gear shifting unit 60 whenever the mock gear stage is switched. Since gear shifting of an AT gear stage is performed at the same time as gear shifting of a mock gear stage, gear shifting of the stepped gear shifting unit 60 is performed with change of the engine rotation speed Ne and even a shock following the gear shifting of the stepped gear shifting unit 60 is less likely to give discomfort to a driver.

The hybrid control unit 104 selectively forms the motor-driven travel mode or the hybrid travel mode as a travel mode depending on travel conditions and causes the vehicle 10 to travel in each travel mode. For example, the hybrid control unit 104 forms the motor-driven travel mode in a motor-driven travel area in which the required drive power Pwdem is less than a predetermined threshold value, and forms the hybrid travel mode in a hybrid travel area in which the required drive power Pwdem is equal to or greater than the predetermined threshold value. Although the required drive power Pwdem is in the motor-driven travel area, the hybrid control unit 104 sets the hybrid travel mode when the SOC value SOC of the battery 54 is less than a predetermined engine-start threshold value, when warm-up of the engine 12 is necessary, or the like. The engine-start threshold value is a predetermined threshold value for determining whether the SOC value is a value at which the engine 12 needs to be forcibly started to charge the battery 54.

Figure 9:
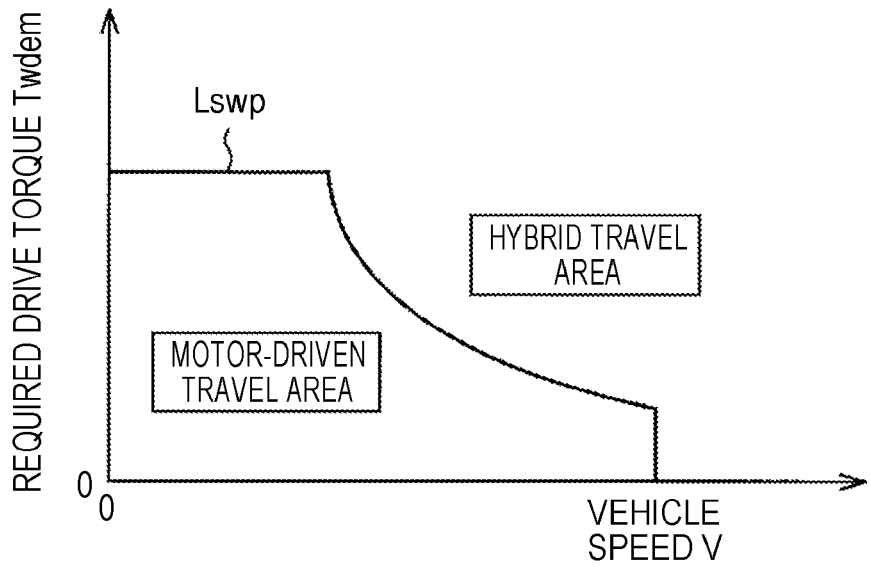
FIG. 9 is a diagram illustrating an example of a power source switching map which is used for switching control of motor-driven travel and hybrid travel of the vehicle.

FIG. 9 is a diagram illustrating an example of a power source switching map which is used for switching control between motor-driven travel and hybrid travel. In FIG. 9, a solid line Lswp is a boundary line between the motor-driven travel area and the hybrid travel area at which switching between the motor-driven travel and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high, the required drive torque Twdem is relatively great, and the required drive power Pwdem is relatively great is defined in advance in the hybrid travel area. When the SOC value SOC of the battery 54 is less than the engine-start threshold value or when warm-up of the engine 12 is necessary, the motor-driven travel area in FIG. 9 may be changed to the hybrid travel area.

When the motor-driven travel mode is set up and the required drive power Pwdem can be realized by only the second rotary machine MG2, the hybrid control unit 104 causes the vehicle 10 to travel in a single-motor-driven travel manner using the second rotary machine MG2. On the other hand, when the motor-driven travel mode is set up and the required drive power Pwdem cannot be realized by only the second rotary machine MG2, the hybrid control unit 104 causes the vehicle 10 to travel in a two-motor-driven travel manner. Although the required drive power Pwdem can be realized by only the second rotary machine MG2, the hybrid control unit 104 may cause the vehicle 10 to travel in the two-motor-driven travel manner when use of both the first rotary machine MG1 and the second rotary machine MG2 is more efficient than use of only the second rotary machine MG2.

When the hybrid travel mode is set up at the time of stopping of the engine 12, the hybrid control unit 104 performs start control for starting the engine 12. When starting of the engine 12 is performed, the hybrid control unit 104 starts the engine 12, for example, by performing ignition when the engine rotation speed Ne is equal to or higher than a predetermined rotation speed at which ignition is possible while increasing the engine rotation speed Ne using the first rotary machine MG1. That is, the hybrid control unit 104 starts the engine 12 by cranking the engine 12 using the first rotary machine MG1.

The hybrid control unit 104 sets a target deceleration based on a driver's operation of an accelerator (for example, an accelerator opening θacc or a rate of decrease of the accelerator opening θacc), a vehicle speed V, a gradient of a downhill road, a driver's operation of a brake for operating a wheel brake (for example, a brake operation amount or a brake operation rate), and the like. The hybrid control unit 104 generates a brake torque of the vehicle 10 such that the set target deceleration is realized. The brake torque of the vehicle 10 is generated, for example, by a regenerative torque from the second rotary machine MG2, a wheel brake torque from a wheel brake device which is not illustrated, an engine brake torque from the engine 12, and the like. The brake torque of the vehicle 10 is preferentially generated by the regenerative torque from the second rotary machine MG2, for example, from the viewpoint of improvement in fuel efficiency. When the regenerative torque from the second rotary machine MG2 is limited due to a high SOC value SOC of the battery 54 or the like and/or a great target deceleration is set, the brake torque of the vehicle 10 is generated by the wheel brake torque and/or the engine brake torque instead of the regenerative torque or in addition to the regenerative torque. When the engine brake torque is generated during motor-driven travel, the hybrid control unit 104 generates a desired engine brake torque based on the engine rotation speed Ne by increasing the engine rotation speed Ne using the first rotary machine MG1 in a state in which the engine 12 is stopped.

When gear shifting control of the stepped gear shifting unit 60 by the AT gear shifting control unit 102 ends, the learning control unit 106 performs learning control for learning a command value P [kPa] for controlling the operating states of the engagement devices CB associated with gear shifting in the gear shifting control of the stepped gear shifting unit 60 such that it is reflected in control of the engagement devices CB associated with gear shifting in the next gear shifting control. The command value P [kPa] is calculated (P=Pbase+ΔP) based on a hydraulic pressure base value Pbase [kPa] and a learning correction amount ΔP [kPa]. The hydraulic pressure base value Pbase [kPa] is determined from an input torque which is input to an input shaft of the stepped gear shifting unit 60, that is, the intermediate transmission member 70, for example, using a map which is determined for each type of gear shifting in which powering-on or powering-off and upshift or downshift are combined. The learning correction amount ΔP [kPa] is calculated by a learning correction amount calculating unit 106a which is provided in the learning control unit 106.

When gear shifting control of the stepped gear shifting unit 60 by the AT gear shifting control unit 102 ends, the learning correction amount calculating unit 106a calculates the learning correction amount ΔP [kPa]. For example, the learning correction amount calculating unit 106a calculates the learning correction amount ΔP [kPa] from a rate of change of the rotation speed of the intermediate transmission member 70 under gear shifting control which is performed in the stepped gear shifting unit 60 by AT gear shifting control unit 102 using a preset map. For example, when powering-on and upshift are performed, the learning correction amount calculating unit 106a calculates the learning correction amount ΔP [kPa] using a map based on a difference between a blast amount of the intermediate transmission member 70 and a target value thereof which is generated at the time of start of an inertia phase under gear shifting control which is performed in the stepped gear shifting unit 60 by the AT gear shifting control unit 102. The blast amount is a temporary increase of the rotation speed of the intermediate transmission member 70.

The initial learning completion determining unit 108 determines whether initial learning (hereinafter referred to as "initial learning") which is performed by the learning control unit 106 during a predetermined period TE after the vehicle 10 has been manufactured is completed depending on whether the learning correction amount ΔP [kPa] calculated by the learning correction amount calculating unit 106a during travel after the vehicle 10 has been manufactured converges. The initial learning is for the learning control unit 106 to learn the command value P [kPa] after the vehicle 10 has been manufactured in order to decrease unevenness in a gear shifting characteristic of the stepped gear shifting unit 60 which is generated due to production unevenness from manufacture of the vehicle 10. The initial learning is completed when the unevenness in the gear shifting characteristic of the stepped gear shifting unit 60 due to production unevenness from manufacture of the vehicle 10 is decreased, that is, when the learning correction amount ΔP [kPa] calculated by the learning correction amount calculating unit 106a during travel after the vehicle 10 has been manufactured converges. The predetermined period TE is a period after the vehicle 10 has been manufactured and until the unevenness in the gear shifting characteristic of the stepped gear shifting unit 60 due to production unevenness from manufacture of the vehicle 10 is decreased. That is, the predetermined period TE is a period after the vehicle 10 has been manufactured and until the learning correction amount ΔP [kPa] calculated by the learning correction amount calculating unit 106a converges.

Figure 10:
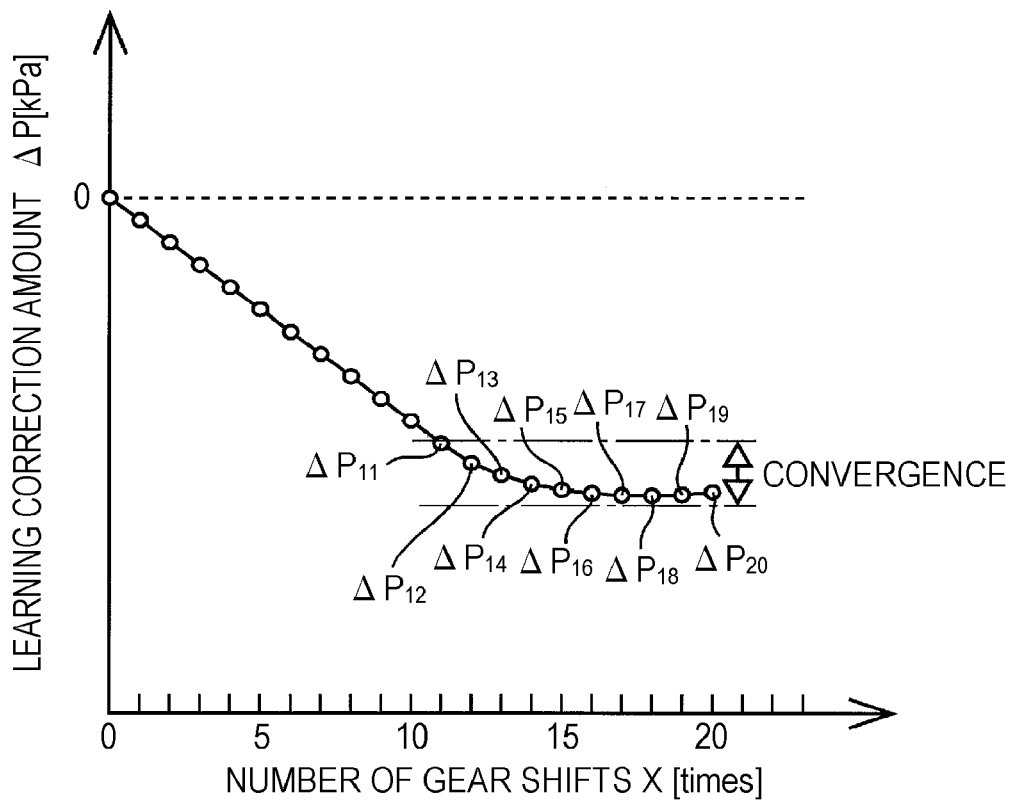
FIG. 10 is a diagram illustrating a relationship between the number of gear shifts in which gear shifting control is performed in the mechanical stepped gear shifting unit after the vehicle has been manufactured and a learning correction amount which is calculated by a learning correction amount calculating unit after gear shifting control in the mechanical stepped gear shifting unit has been completed and illustrating an example in which the learning correction amount decreases whenever gear shifting control is performed in the mechanical stepped gear shifting unit and the learning correction amounts become substantially constant and converge when the number of gear shifts is equal to or greater than a predetermined number.
Figure 11:
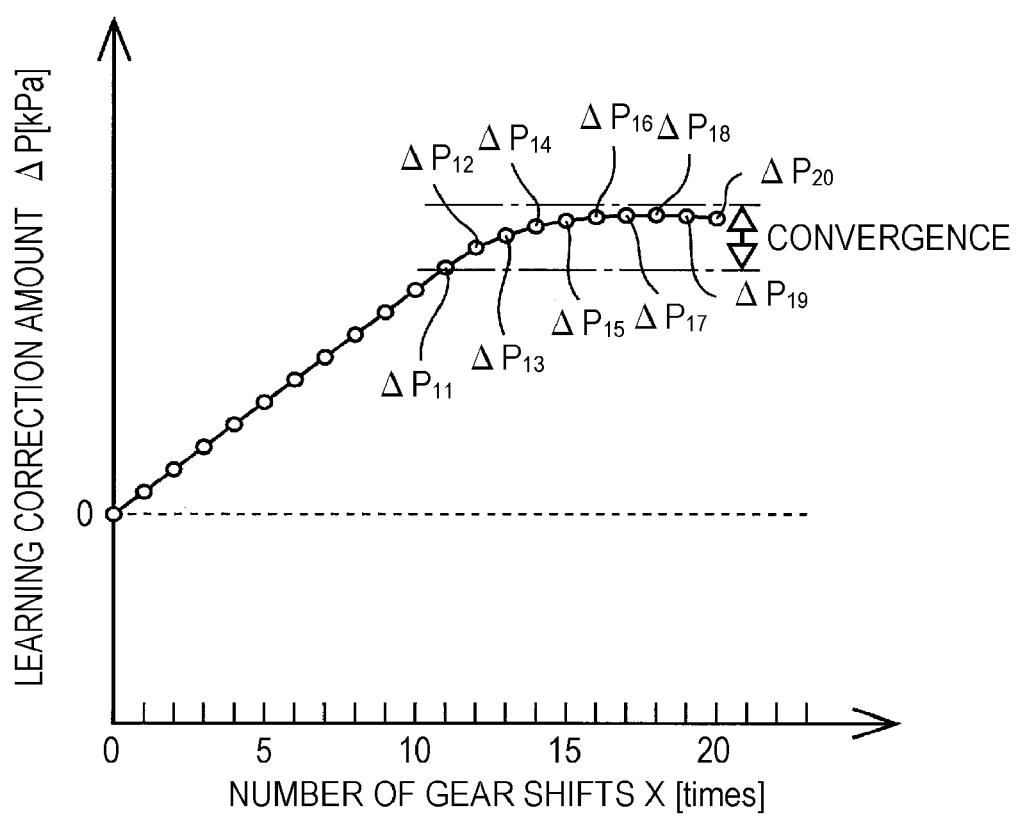
FIG. 11 is a diagram illustrating a relationship between the number of gear shifts in which gear shifting control is performed in the mechanical stepped gear shifting unit after the vehicle has been manufactured and a learning correction amount which is calculated by a learning correction amount calculating unit after gear shifting control in the mechanical stepped gear shifting unit has been completed and illustrating an example in which the learning correction amount increases whenever gear shifting control is performed in the mechanical stepped gear shifting unit and the learning correction amounts become substantially constant and converge when the number of gear shifts is equal to or greater than a predetermined number.

For example, when a difference (ΔPn−ΔPn−1) between a current learning correction amount ΔPn and a previous learning correction amount ΔPn−1 is within a predetermined range W continuously a plurality of number of times (for example, nine times) whenever gear shifting control of the stepped gear shifting unit 60 by the AT gear shifting control unit 102 ends, the initial learning completion determining unit 108 determines that the initial learning has been completed. That is, as illustrated in FIGS. 10 and 11, the initial learning completion determining unit 108 determines that the initial learning has been completed when the difference (ΔP20−ΔP19) between the learning correction amount ΔP20 and the learning correction amount ΔP19, the difference (ΔP19−ΔP18) between the learning correction amount ΔP19 and the learning correction amount ΔP18, the difference (ΔP18−ΔP17) between the learning correction amount ΔP18 and the learning correction amount ΔP17, the difference (ΔP17−ΔP16) between the learning correction amount ΔP17 and the learning correction amount ΔP16, the difference (ΔP16−ΔP15) between the learning correction amount ΔP16 and the learning correction amount ΔP15, the difference (ΔP15−ΔP14) between the learning correction amount ΔP15 and the learning correction amount ΔP14, the difference (ΔP14−ΔP13) between the learning correction amount ΔP14 and the learning correction amount ΔP13, the difference (ΔP13−ΔP12) between the learning correction amount ΔP13 and the learning correction amount ΔP12, and the difference (ΔP12−ΔP11) between the learning correction amount ΔP12 and the learning correction amount ΔP11 are within the predetermined range W. FIGS. 10 and 11 are diagrams illustrating a relationship between the number (frequency) of gear shifts X [times] in which gear shifting control is performed in the stepped gear shifting unit 60 after the vehicle 10 has been manufactured and the learning correction amount ΔP [kPa] which is calculated by the learning correction amount calculating unit 106a after gear shifting control in the stepped gear shifting unit 60 has been completed. FIG. 10 is a diagram illustrating an example in which the learning correction amount ΔP decreases whenever gear shifting control is performed in the stepped gear shifting unit 60 and the learning correction amount ΔP becomes substantially constant and converges when the number of gear shifts X is equal to or greater than a predetermined number. FIG. 11 is a diagram illustrating an example in which the learning correction amount ΔP increases whenever gear shifting control is performed in the stepped gear shifting unit 60 and the learning correction amount ΔP becomes substantially constant and converges when the number of gear shifts X is equal to or greater than a predetermined number. As illustrated in FIGS. 10 and 11, the learning correction amount ΔP is set to zero [kPa] when the vehicle 10 has been manufactured.

When the initial learning completion determining unit 108 determines that the initial learning has not been completed, that is, when the initial learning completion determining unit 108 determines that the initial learning is not completed, the learning progress estimating unit 110 estimates whether the initial learning is not progressing. For example, when a total travel distance L [km] of the vehicle 10 detected from an odometer (an integrated odometer) is less than a predetermined distance L1A [km], the learning progress estimating unit 110 estimates that the initial learning is not progressing. When the total travel distance L [km] of the vehicle 10 detected from the odometer is equal to or greater than the predetermined distance L1A [km], the learning progress estimating unit 110 estimates that the initial learning is progressing. The predetermined distance L1A is a determination value for determining whether gear shifting control of the stepped gear shifting unit 60 has been performed a predetermined number of times by the AT gear shifting control unit 102 during travel of the vehicle, that is, whether learning control has been performed a predetermined number of times by the learning control unit 106 during travel of the vehicle.

When the initial learning completion determining unit 108 determines that the initial learning is not completed, the required engine torque determining unit 112 determines whether the required engine torque (a required load) Tedem [Nm] required for the engine 12 is less than a predetermined engine torque (a predetermined load) Te1 [Nm]. The required engine torque Tedem [Nm] is calculated, for example, based on the accelerator opening θacc and the vehicle speed V.

A supercharging pressure control unit 104a is provided in the hybrid control unit 104. A target supercharging pressure setting unit 104b is provided in the supercharging pressure control unit 104a. The supercharging pressure control unit 104a continuously controls the valve opening of the waste gate valve 30 such that the supercharging pressure Pchg [kPa] detected by the supercharging pressure sensor 40 reaches a target supercharging pressure (a supercharging pressure) Pchgtgt [kPa] set by the target supercharging pressure setting unit 104b.

A supercharging pressure limiting unit 104c is provided in the target supercharging pressure setting unit 104b. When a preset first condition CD1 is satisfied, the supercharging pressure limiting unit 104c limits the target supercharging pressure Pchgtgt [kPa] to be equal to or less than a predetermined pressure Pchgtgt1 [kPa], for example, sets the target supercharging pressure Pchgtgt to an atmospheric pressure during gear shifting and gear non-shifting of the stepped gear shifting unit 60. The first condition CD1 is satisfied when the initial learning completion determining unit 108 determines that the initial learning is not completed, the required engine torque determining unit 112 determines that the required engine torque Tedem is less than the predetermined engine torque Te1, and the learning progress estimating unit 110 estimates that the initial learning is not progressing. The predetermined pressure Pchgtgt1 is a target supercharging pressure Pchgtgt, that is, a supercharging pressure Pchg, with which erroneous learning of the command value P [kPa] does not occur when the learning control is performed by the learning control unit 106. When the target supercharging pressure Pchgtgt is set to the atmospheric pressure which is constant during gear shifting and gear non-shifting of the stepped gear shifting unit 60 by the supercharging pressure limiting unit 104c, the waste gate valve 30 is fully opened to prohibit supercharging by the supercharger 18 during gear shifting and gear non-shifting of the stepped gear shifting unit 60.

When a preset second condition CD2 is satisfied, the supercharging pressure limiting unit 104c limits the target supercharging pressure Pchgtgt to be equal to or less than the predetermined pressure Pchgtgt1 [kPa], for example, sets the target supercharging pressure Pchgtgt to the predetermined pressure Pchgtgt1, during gear shifting and gear non-shifting of the stepped gear shifting unit 60. The second condition CD2 is satisfied when the initial learning completion determining unit 108 determines that the initial learning is not completed, the required engine torque determining unit 112 determines that the required engine torque Tedem is less than the predetermined engine torque Te1, and the learning progress estimating unit 110 estimates that the initial learning is progressing. When the target supercharging pressure Pchgtgt is set to the predetermined pressure Pchgtgt1 which is constant during gear shifting and gear non-shifting of the stepped gear shifting unit 60 by the supercharging pressure limiting unit 104c, the valve opening of the waste gate valve 30 is continuously controlled such that the supercharging pressure Pchg reaches the target supercharging pressure Pchgtgt during gear shifting and gear non-shifting of the stepped gear shifting unit 60. That is, supercharging by the supercharger 18 is permitted when the target supercharging pressure Pchgtgt is set to the predetermined pressure Pchgtgt1 by the supercharging pressure limiting unit 104c.

When the initial learning completion determining unit 108 determines that the initial learning is completed, the supercharging pressure limiting unit 104c prohibits limiting of the target supercharging pressure Pchgtgt to be equal to or less than the predetermined pressure Pchgtgt1. When limiting of the target supercharging pressure Pchgtgt to be equal to or less than the predetermined pressure Pchgtgt1 is prohibited by the supercharging pressure limiting unit 104c, the target supercharging pressure setting unit 104b sets the target supercharging pressure Pchgtgt to a target supercharging pressure Pchgtgtbase. The target supercharging pressure Pchgtgtbase is a target supercharging pressure Pchgtgt which is calculated based on the engine rotation speed Ne [rpm] detected by the engine rotation speed sensor 88 and the accelerator opening θacc [%] detected by the accelerator opening sensor 96. The target supercharging pressure Pchgtgtbase is the target supercharging pressure Pchgtgt which is set by the target supercharging pressure setting unit 104b when the target supercharging pressure Pchgtgt is not limited by the supercharging pressure limiting unit 104c.

Only when the initial learning completion determining unit 108 determines that the initial learning is not completed and the required engine torque determining unit 112 determines that the required engine torque Tedem is less than the predetermined engine torque Te1, the target supercharging pressure Pchgtgt is limited to be equal to or less than the predetermined pressure Pchgtgt1 [kPa] by the supercharging pressure limiting unit 104c. When the initial learning completion determining unit 108 determines that the initial learning is not completed and the required engine torque determining unit 112 determines that the required engine torque Tedem is equal to or greater than the predetermined engine torque Te1, the supercharging pressure limiting unit 104c prohibits limiting of the target supercharging pressure Pchgtgt to be equal to or less than the predetermined pressure Pchgtgt1. When limiting of the target supercharging pressure Pchgtgt to be equal to or less than the predetermined pressure Pchgtgt1 is prohibited by the supercharging pressure limiting unit 104c and the target supercharging pressure Pchgtgt is set to the target supercharging pressure Pchgtgtbase by the target supercharging pressure setting unit 104b, the learning control by the learning control unit 106 is prohibited. Accordingly, it is possible to prevent erroneous learning of the command value P [kPa] when the initial learning is not completed.

When the target supercharging pressure Pchgtgt is limited to be equal to or less than the predetermined pressure Pchgtgt1 by the supercharging pressure limiting unit 104c, the hybrid control unit 104 controls the MG2 torque (a torque) Tm of the second rotary machine MG2 such that a decrease of the engine torque Te due to limiting of the target supercharging pressure Pchgtgt to be equal to or less than the predetermined pressure Pchgtgt1 is compensated for. That is, the hybrid control unit 104 serves as a rotary machine torque control unit that controls the MG2 torque Tm of the second rotary machine MG2 such that the decrease of the engine torque Te due to limiting of the target supercharging pressure Pchgtgt to be equal to or less than the predetermined pressure Pchgtgt1 is compensated for.

Figure 12A:
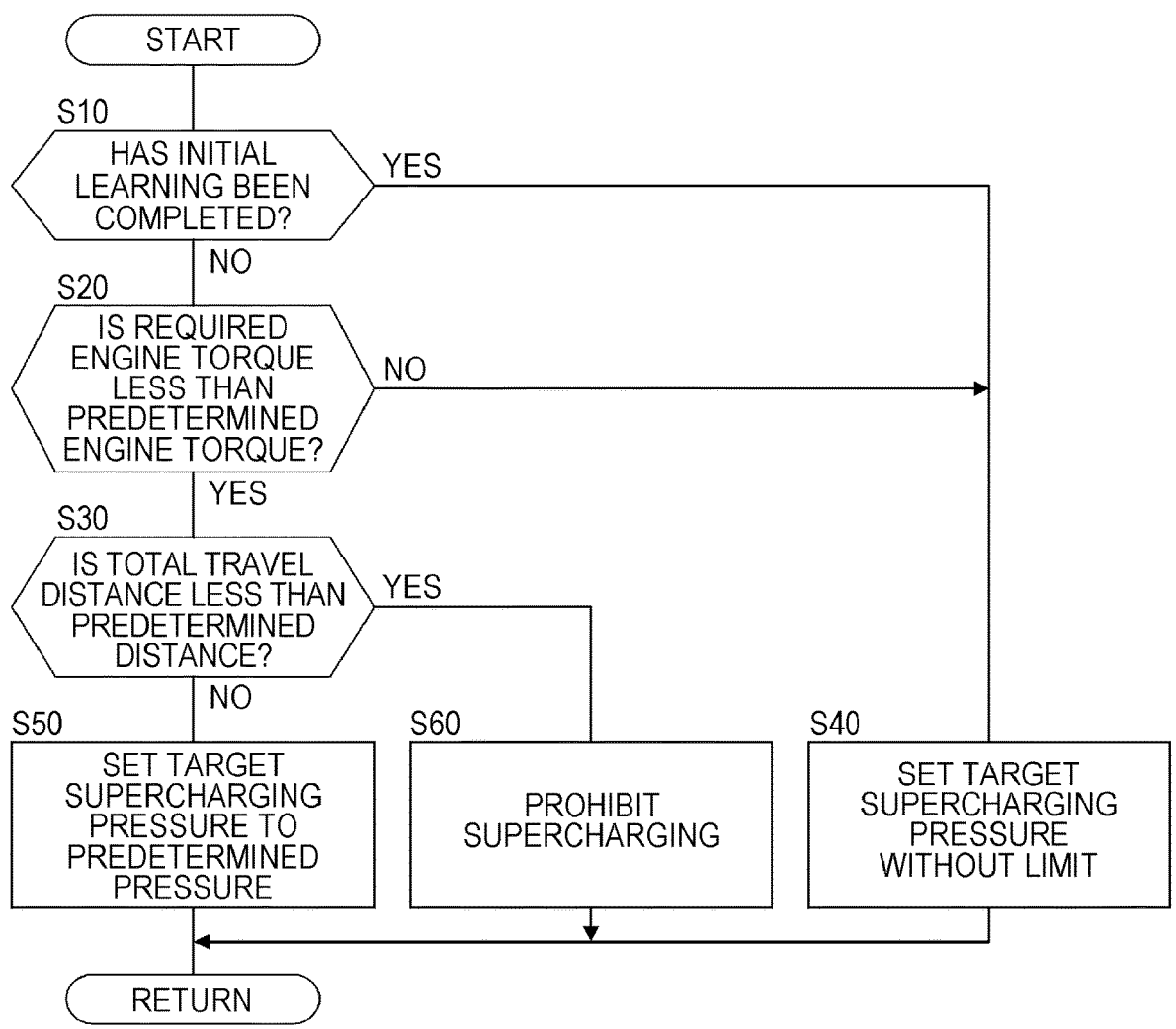
FIG. 12A is a flowchart illustrating an example of a principal part of a control operation of an electronic control unit which is provided in the controller for a vehicle, that is, a control operation of limiting a target supercharging pressure of a supercharger when initial learning is not completed.

FIG. 12A is a flowchart illustrating a principal part of the control operation of the electronic control unit 100, that is, a flowchart illustrating an example of the control operation of limiting the target supercharging pressure Pchgtgt of the supercharger 18 when the initial learning is not completed.

First, in Step (which will be hereinafter omitted) S10 corresponding to the function of the initial learning completion determining unit 108, it is determined whether initial learning which is performed by the learning control unit 106 during a predetermined period TE after the vehicle 10 has been manufactured has been completed. When the determination result of S10 is negative, that is, when the initial learning has not been completed, S20 corresponding to the function of the required engine torque determining unit 112 is performed and it is determined whether the required engine torque Tedem is less than a predetermined engine torque Te1. When the determination result of S20 is positive, S30 corresponding to the function of the learning progress estimating unit 110 is performed. When the determination result of S10 is positive, that is, when the initial learning has been completed, or when the determination result of S20 is negative, that is, when the required engine torque Tedem is equal to or greater than the predetermined engine torque Te1, S40 corresponding to the functions of the target supercharging pressure setting unit 104b and the supercharging pressure limiting unit 104c is performed. In S30 illustrated in FIG. 12A, it is estimated whether the initial learning is not being progress, that is, it is determined whether a total travel distance L [km] is less than a predetermined distance L1A [km]. In S40, limiting of the target supercharging pressure Pchgtgt to be equal to or less than the predetermined pressure Pchgtgt1 is prohibited and the target supercharging pressure Pchgtgt is set to a target supercharging pressure Pchgtgtbase.

When the determination result of S30 is negative, that is, when the total travel distance L [km] is equal to or greater than the predetermined distance L1A [km], S50 corresponding to the function of the supercharging pressure limiting unit 104c is performed. When the determination result of S30 is positive, that is, when the total travel distance L [km] is less than the predetermined distance L1A [km], S60 corresponding to the function of the supercharging pressure limiting unit 104c is performed. In S50, the target supercharging pressure Pchgtgt is set to the predetermined pressure Pchgtgt1 during gear shifting and gear non-shifting of the stepped gear shifting unit 60. In S60, the target supercharging pressure Pchgtgt is set to the atmospheric pressure during gear shifting and gear non-shifting of the stepped gear shifting unit 60, and the waste gate valve 30 is fully opened to prohibit supercharging by the supercharger 18 during gear shifting and gear non-shifting of the stepped gear shifting unit 60.

As described above, according to the first embodiment, the learning control unit 106 that performs learning control for learning a command value P for the engagement devices CB associated with gear shifting of gear shifting control of the stepped gear shifting unit 60 and the supercharging pressure limiting unit 104c that limits the target supercharging pressure Pchgtgt of the supercharger 18 during gear shifting of the stepped gear shifting unit 60 to be equal to or less than a predetermined pressure Pchgtgt1 until initial learning which is performed by the learning control unit 106 during a predetermined period TE after the vehicle 10 has been manufactured is completed are provided. Accordingly, since the target supercharging pressure Pchgtgt during gear shifting of the stepped gear shifting unit 60 is limited to be equal to or less than the predetermined pressure Pchgtgt1 by the supercharging pressure limiting unit 104c until initial learning (initial learning) which is performed by the learning control unit 106 during a predetermined period TE after the vehicle 10 has been manufactured is completed, that is, until unevenness in a gear shifting characteristic of the stepped gear shifting unit 60 due to production unevenness from manufacture of the vehicle 10 is decreased, it is possible to shorten the time required until unevenness in a gear shifting characteristic of the stepped gear shifting unit 60 due to production unevenness from manufacture of the vehicle 10 is decreased, for example, in comparison with a case in which the learning control is stopped when the target supercharging pressure Pchgtgt is not limited to be equal to or less than the predetermined pressure Pchgtgt1 and the supercharging pressure Pchg is high in order to prevent erroneous learning of the command value P.

According to the first embodiment, the supercharging pressure limiting unit 104c limits the target supercharging pressure Pchgtgt of the supercharger 18 to be equal to or less than the predetermined pressure Pchgtgt1 even during gear non-shifting of the stepped gear shifting unit 60. Accordingly, since the target supercharging pressure Pchgtgt is limited to be equal to or less than the predetermined pressure Pchgtgt1 during gear shifting and gear non-shifting of the stepped gear shifting unit 60 by the supercharging pressure control unit 104a, it is possible to prevent a level difference from occurring in the magnitude of the engine torque Te which is output from the engine 12 before and after gear shifting of the stepped gear shifting unit 60.

According to the first embodiment, the supercharging pressure limiting unit 104c prohibits supercharging by the supercharger 18 when the initial learning is not completed and the total travel distance L of the vehicle 10 is less than the predetermined distance L1A, and permits supercharging by the supercharger 18 when the total travel distance L is equal to or greater than the predetermined distance L1A. Accordingly, when the total travel distance L is less than the predetermined distance L1A and it is estimated that the initial learning is not progressing, supercharging by the supercharger 18 is prohibited to advance progress of the initial learning. When the total travel distance L is equal to or greater than the predetermined distance L1A and it is estimated that the initial learning is progressing, supercharging by the supercharger 18 is permitted to perform both progress of the initial learning and supercharging by the supercharger 18.

According to the first embodiment, when the initial learning is not completed and gear shifting of the stepped gear shifting unit 60 is being performed, the supercharging pressure limiting unit 104c keeps the target supercharging pressure Pchgtgt by the supercharger 18 constant and thus it is possible to advance progress of the initial learning.

According to the first embodiment, only when the initial learning is not completed and the required engine torque Tedem required for the engine 12 is less than the predetermined engine torque Te1, the supercharging pressure limiting unit 104c limits the target supercharging pressure Pchgtgt to be equal to or less than the predetermined pressure Pchgtgt1. Accordingly, when the required engine torque Tedem required for the engine 12 is equal to or greater than the predetermined engine torque Te1, the target supercharging pressure Pchgtgt is not limited to be equal to or less than the predetermined pressure Pchgtgt1 and thus it is possible to curb a shortage of the engine torque when the required engine torque Tedem for the engine 12 is high.

According to the first embodiment, the vehicle 10 includes the second rotary machine MG2 that is connected to the power transmission path between the engine 12 and the driving wheels 14 and further includes the hybrid control unit 104 that controls the MG2 torque Tm of the second rotary machine MG2 such that a decrease of the engine torque Te due to limiting of the target supercharging pressure Pchgtgt to be equal to or less than the predetermined pressure Pchgtgt1 by the supercharging pressure limiting unit 104c is compensated for. Accordingly, it is possible to compensate for the decrease of the engine torque Te due to limiting of the target supercharging pressure Pchgtgt to be equal to or less than the predetermined pressure Pchgtgt1 by the supercharging pressure limiting unit 104c using the MG2 torque Tm which is output from the second rotary machine MG2.

A second embodiment of the disclosure will be described below. In the following description, common elements between two embodiments will be referred to by the same reference signs and description thereof will not be repeated.

Figure 13:
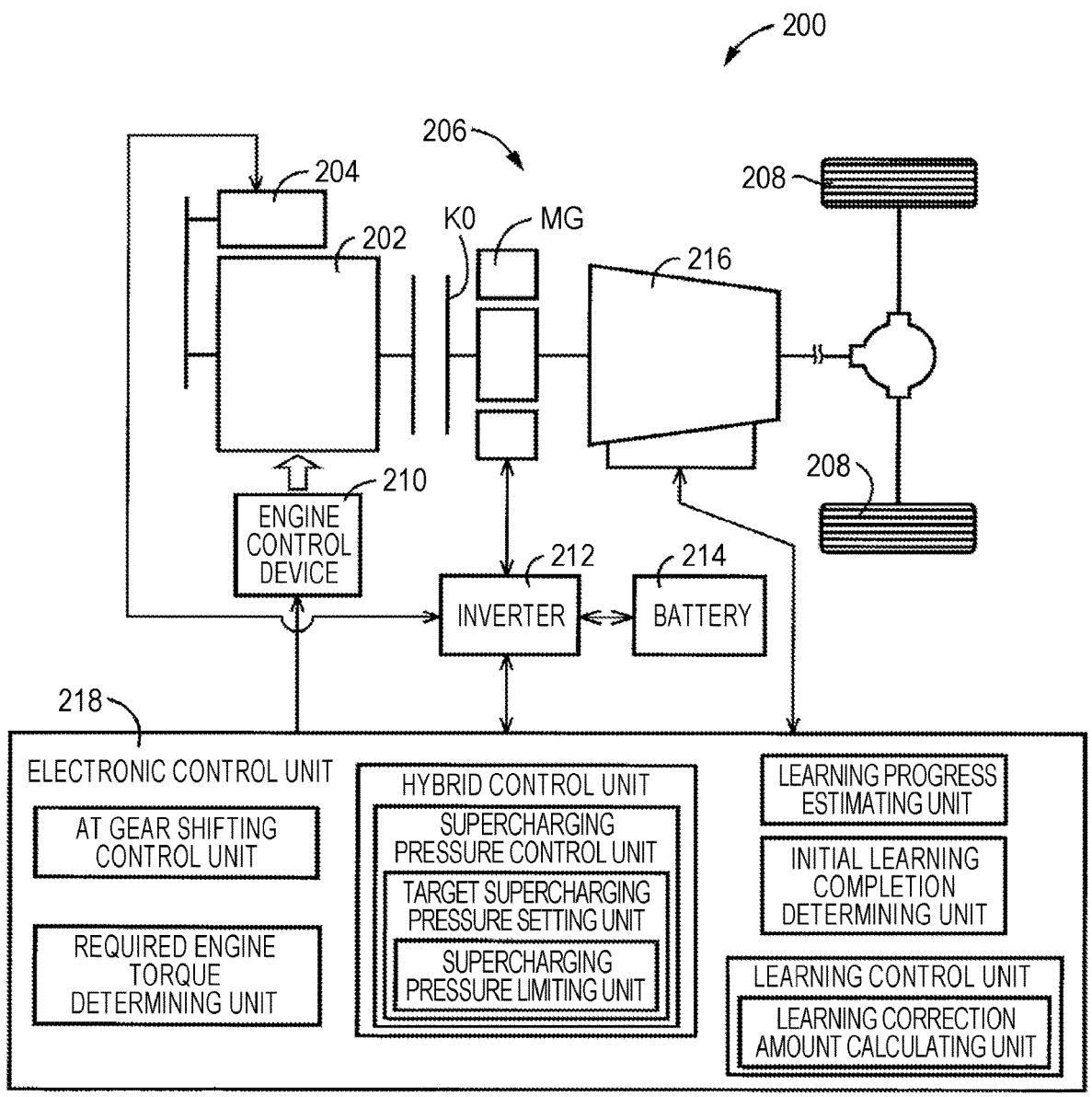
FIG. 13 is a diagram schematically illustrating a configuration of a vehicle to which a second embodiment of the disclosure is applied.

In the second embodiment, a vehicle 200 which is different from the vehicle 10 illustrated in the first embodiment and which is illustrated in FIG. 13 is exemplified. FIG. 13 is a diagram schematically illustrating a configuration of the vehicle 200 to which the disclosure is applied. In FIG. 13, the vehicle 200 is a hybrid vehicle including an engine 202, an alternator 204, a rotary machine MG, a power transmission device 206, and driving wheels 208.

The engine 202 has the same configuration as the engine 12 described in the first embodiment. An engine torque Te of the engine 202 is controlled by causing an electronic control unit (a controller) 218 which will be described later to control an engine control device 210 including a throttle actuator, a fuel injection device, an ignition device, and a waste gate valve which are provided in the vehicle 200.

The alternator 204 is a rotary electric machine having a function of a starter that cranks the engine 202 and a function of a power generator. The alternator 204 is a rotary machine which is mechanically connected to the engine 202 and to which power of the engine 202 is transmitted. The alternator 204 is rotationally driven by the engine 202 and thus generates electric power with power of the engine 202. The rotary machine MG is a rotary electric machine having a function of an electric motor and a function of a power generator and is called a motor generator. The rotary machine MG is a second rotary machine that is connected to the driving wheels 208 via the power transmission device 206 in a power-transmittable manner. The alternator 204 and the rotary machine MG are connected to a battery 214 provided in the vehicle 200 via an inverter 212 provided in the vehicle 200. In the alternator 204 and the rotary machine MG, an alternator torque Talt which is an output torque of the alternator 204 and an MG torque Tmg which is an output torque of the rotary machine MG are controlled by causing the electronic control unit 218 to control the inverter 212. A generated electric power Walt of the alternator 204 fills the battery 214 or is consumed in the rotary machine MG. The rotary machine MG outputs the MG torque Tmg using all or a part of the generated electric power Walt or using electric power from the battery 214 in addition to the generated electric power Walt. In this way, the rotary machine MG is driven with the generated electric power Walt of the alternator 204.

The power transmission device 206 includes a clutch K0 and an automatic transmission 216. An input rotary member of the automatic transmission 216 is connected to the engine 202 via the clutch K0 and is directly connected to the rotary machine MG. In the power transmission device 206, power of the engine 202 is transmitted to the driving wheels 208 sequentially via the clutch K0, the automatic transmission 216, and the like and power of the rotary machine MG is transmitted to the driving wheels 208 via the automatic transmission 216 and the like. The engine 202 and the rotary machine MG are power sources for travel of the vehicle 200 that are connected to the driving wheels 208 in a power-transmittable manner.

The clutch K0 is a hydraulic frictional engagement device that connects or disconnects the power transmission path between the engine 202 and the driving wheels 208. The automatic transmission 216 is, for example, a known planetary gear type automatic transmission similarly to the stepped gear shifting unit 60 described in the first embodiment.

The vehicle 200 can perform motor-driven travel in which electric power from the battery 214 is used and only the rotary machine MG is used as the power source for travel in a state in which the clutch K0 is disengaged and operation of the engine 202 is stopped. The vehicle 200 can perform hybrid travel in which the engine 202 operates in a state in which the clutch K0 is engaged and at least the engine 202 is used as the power source for travel.

The vehicle 200 includes an electronic control unit 218 which is a controller including a control device for the vehicle 200 associated with control of the engine 202, the alternator 204, the automatic transmission 216, the rotary machine MG, and the like. The electronic control unit 218 has the same configuration as the electronic control unit 100 described in the first embodiment. The electronic control unit 218 is supplied with various signals which are the same as supplied to the electronic control unit 100. Various command signals which are the same as output from the electronic control unit 100 are output from the electronic control unit 218. The electronic control unit 218 has functions equivalent to the functions of the AT gear shifting control unit 102, the hybrid control unit 104, the supercharging pressure control unit 104a, the target supercharging pressure setting unit 104b, the supercharging pressure limiting unit 104c, the learning control unit 106, the learning correction amount calculating unit 106a, the initial learning completion determining unit 108, the learning progress estimating unit 110, and the required engine torque determining unit 112 which are included in the electronic control unit 100, and has a function of limiting the target supercharging pressure Pchgtgt of the supercharger 18 when the initial learning is not completed similarly to the electronic control unit 100. The electronic control unit 218 can realize a control function capable of shortening the time required until unevenness in a gear shifting characteristic of the automatic transmission 216 due to production unevenness from manufacture of the vehicle 200 is decreased, which is the same function as realized by the electronic control unit 100 as described in the first embodiment.

While the first embodiment and the second embodiment of the disclosure have been described in detail with reference to the accompanying drawings, the disclosure can be applied to other aspects.

For example, the supercharging pressure limiting unit 104c according to the first embodiment limits the target supercharging pressure Pchgtgt to be equal to or less than the predetermined pressure Pchgtgt1 during gear shifting and gear non-shifting of the stepped gear shifting unit 60 when the initial learning is not completed. However, when the initial learning is not completed and the stepped gear shifting unit 60 is not performing gear shifting, the target supercharging pressure Pchgtgt may not be limited to be equal to or less than the predetermined pressure Pchgtgt1.

Figure 12B:
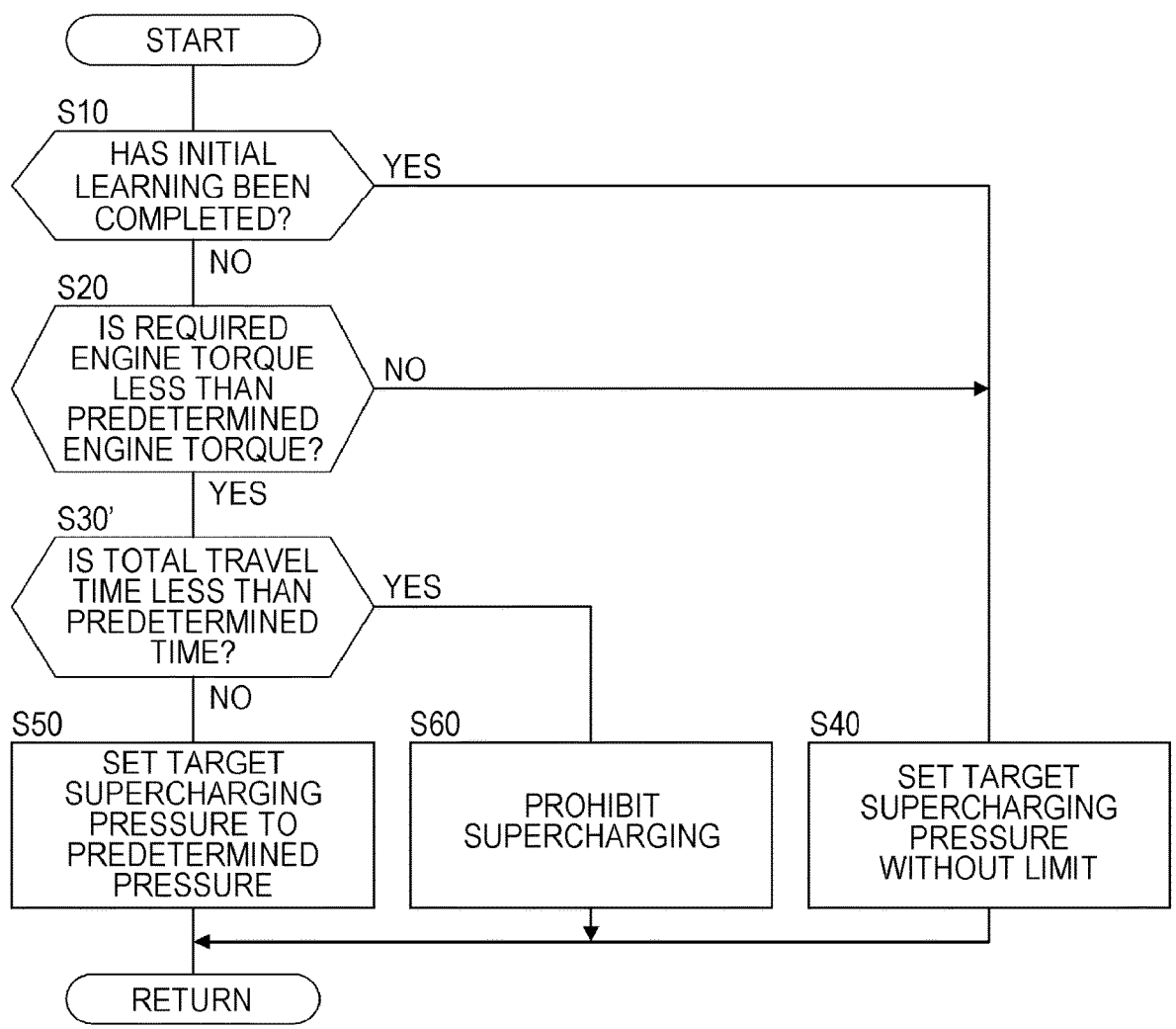
FIG. 12B is a flowchart illustrating an alternative example of a principal part of a control operation of an electronic control unit which is provided in the controller for a vehicle, that is, a control operation of limiting a target supercharging pressure of a supercharger when initial learning is not completed.

The learning progress estimating unit 110 according to the first embodiment estimates that the initial learning is not progressing when the total travel distance L [km] is less than the predetermined distance L1A [km], and estimates that the initial learning is progressing when the total travel distance L [km] is equal to or greater than the predetermined distance L1A [km]. For example, the learning progress estimating unit 110 may estimate that the initial learning is not progressing when a total travel time Ti [sec] of the vehicle 10 is less than a predetermined time Ti1 [sec], and estimate that the initial learning is progressing when the total travel time Ti [sec] is equal to or greater than the predetermined time Ti1 [sec]. As described above, the total travel distance L [km] may be replaced with the total travel time Ti [sec] as an alternative example. Hereinafter, the alternative example is explained in detail by using FIG. 12B which shows a flowchart illustrating a principal part of the control operation of the electronic control unit 100. In S30' illustrated in FIG. 12B, it is estimated whether the initial learning is not being progress, that is, it is determined whether a total travel time Ti [sec] is less than a predetermined time Ti1 [sec]. When the determination result of S30' is positive, that is, when the total travel time Ti [sec] is less than the predetermined time Ti1 [sec], S60 corresponding to the function of the supercharging pressure limiting unit 104c is performed. Here, the predetermined time Ti1 is a determination value for determining whether the AT gear shifting control unit 102 performs gear shifting control of the stepped gear shifting unit 60 about a predetermined number of times during travel of the vehicle, that is, whether the learning control unit 106 performs learning control about a predetermined number of times during travel of the vehicle. In the alternative example in which the total travel distance L [km] in the first embodiment is replaced with the total travel time Ti [sec], the steps other than S30' in FIG. 12B are the same as the steps in FIG. 12A in the first embodiment.

The supercharging pressure limiting unit 104c according to the first embodiment sets the target supercharging pressure Pchgtgt to the predetermined pressure Pchgtgt1 which is constant during gear shifting and gear non-shifting of the stepped gear shifting unit 60 when the initial learning is not completed. For example, the supercharging pressure limiting unit 104c may change the target supercharging pressure Pchgtgt with the predetermined pressure Pchgtgt1 as an upper limit during gear shifting and gear non-shifting of the stepped gear shifting unit 60 when the initial learning is not completed.

In the first embodiment, the one-way clutch F0 is described as a lock mechanism that can fix the carrier CA0 in a non-rotatable manner, but the disclosure is not limited thereto. The lock mechanism may be an engagement device such as an engaging clutch, a hydraulic frictional engagement device such as a clutch or a brake, a dry engagement device, an electromagnetic frictional engagement device, or a magnetic powder type clutch, which selectively connects the connection shaft 68 and the case 56. Alternatively, the vehicle 10 does not have to include the one-way clutch F0.

In the first embodiment, the stepless gear shifting unit 58 may be a gear shifting mechanism in which a differential operation can be limited by controlling a clutch or brake connected to the rotary element of the differential mechanism 72. The differential mechanism 72 may be a double pinion type planetary gear mechanism. The differential mechanism 72 may be a differential mechanism including four or more rotary elements by connecting a plurality of planetary gear units. The differential mechanism 72 may be a differential gear mechanism in which the first rotary machine MG1 and the intermediate transmission member 70 are respectively connected to a pinion which is rotationally driven by the engine 12 and a pair of bevel gears engaging with the pinion. The differential mechanism 72 may be a mechanism having a configuration in which two or more planetary gear units are connected to each other by some rotary elements constituting them and the engine, the rotary machine, and the driving wheels are connected to the rotary elements of such planetary gear units in a power-transmittable manner.

In the first embodiment, a mechanical pump type supercharger that is rotationally driven by the engine or the electric motor may be provided in addition to the exhaust turbine type supercharger 18.

The above-mentioned embodiments are merely exemplary and the disclosure can be embodied in various aspects which have been subjected to various modifications and improvements based on knowledge of those skilled in the art.

What is claimed is:

1. A controller for a vehicle, the vehicle including an engine with a supercharger and an automatic transmission provided in a power transmission path between the engine and driving wheels, the controller comprising:
    a learning control unit configured to perform learning control of learning a command value associated with gear shifting of the automatic transmission; and
    a supercharging pressure limiting unit configured to limit a supercharging pressure of the supercharger when the automatic transmission is performing gear shifting to be equal to or less than a predetermined pressure until initial learning which is performed by the learning control unit in a predetermined period after the vehicle has been manufactured is completed.

2. The controller for a vehicle according to claim 1, wherein the supercharging pressure limiting unit is configured to limit the supercharging pressure of the supercharger to be equal to or less than the predetermined pressure when the automatic transmission is not performing gear shifting.

3. The controller for a vehicle according to claim 2, wherein:
    the supercharging pressure limiting unit is configured to prohibit supercharging by the supercharger when the initial learning is not completed and a total travel distance of the vehicle is less than a predetermined distance; and
    the supercharging pressure limiting unit is configured to permit supercharging by the supercharger when the initial learning is not completed and the total travel distance is equal to or greater than the predetermined distance.

4. The controller for a vehicle according to claim 2, wherein:
    the supercharging pressure limiting unit is configured to prohibit supercharging by the supercharger when the initial learning is not completed and a total travel time of the vehicle is less than a predetermined time; and
    the supercharging pressure limiting unit is configured to permit supercharging by the supercharger when the initial learning is not completed and the total travel time is equal to or greater than the predetermined time.

5. The controller for a vehicle according to claim 1, wherein the supercharging pressure limiting unit is configured to keep the supercharging pressure of the supercharger constant when the initial learning is not completed and the automatic transmission is performing gear shifting.

6. The controller for a vehicle according to claim 1, wherein the supercharging pressure limiting unit is configured to limit the supercharging pressure to be equal to or less than the predetermined pressure only when the initial learning is not completed and a required load required for the engine is less than a predetermined load.

7. The controller for a vehicle according to claim 1, wherein:
    the vehicle includes a rotary machine that is connected to the power transmission path; and
    the controller further comprises a rotary machine torque control unit configured to control a torque of the rotary machine such that a decrease of an engine torque due to limiting of the supercharging pressure to be equal to or less than the predetermined pressure by the supercharging pressure limiting unit is compensated for.

8. A control method for a vehicle, the vehicle including an engine with a supercharger and an automatic transmission provided in a power transmission path between the engine and driving wheels, the control method comprising:
    performing learning control of learning a command value associated with gear shifting of the automatic transmission; and
    limiting a supercharging pressure of the supercharger when the automatic transmission is performing gear shifting to be equal to or less than a predetermined pressure until initial learning which is performed by the learning control in a predetermined period after the vehicle has been manufactured is completed.

* * * * *